United States Patent
Besong et al.

(10) Patent No.: US 12,344,801 B2
(45) Date of Patent: Jul. 1, 2025

(54) REACTOR FLUID SUPPLY SYSTEMS

(71) Applicant: Recycling Technologies Ltd, Swindon (GB)

(72) Inventors: Marvine Besong, Purton (GB); Trevor Sansom, Cheltenham (GB)

(73) Assignee: DeepTech Recycling, Boars Hill (GB)

( * ) Notice: Subject to any disclaimer, the term of this patent is extended or adjusted under 35 U.S.C. 154(b) by 44 days.

(21) Appl. No.: 17/768,595

(22) PCT Filed: Oct. 15, 2020

(86) PCT No.: PCT/GB2020/052594
§ 371 (c)(1),
(2) Date: Apr. 13, 2022

(87) PCT Pub. No.: WO2021/074626
PCT Pub. Date: Apr. 22, 2021

(65) Prior Publication Data
US 2024/0110106 A1  Apr. 4, 2024

(30) Foreign Application Priority Data
Oct. 16, 2019  (GB) .................................. 1914985

(51) Int. Cl.
*B01J 8/26* (2006.01)
*B01J 8/18* (2006.01)
(Continued)

(52) U.S. Cl.
CPC .............. *C10G 1/10* (2013.01); *B01J 8/1836* (2013.01); *B01J 8/24* (2013.01); *B01J 8/26* (2013.01);
(Continued)

(58) Field of Classification Search
CPC .. C10G 1/10; C10G 2300/1003; B01J 8/1836; B01J 8/24; B01J 8/26;
(Continued)

(56) References Cited

U.S. PATENT DOCUMENTS 3,605,655 A  9/1971  Warshawsky
3,853,498 A  12/1974  Bailie
(Continued)

FOREIGN PATENT DOCUMENTS

CN  103756696 A  *  4/2014
CN  109185876 A    11/2019
(Continued)

OTHER PUBLICATIONS

Machine translation JP 2001-227733. retrieved Jun. 21, 2024 (Year: 2024).*
(Continued)

*Primary Examiner* — Huy Tram Nguyen
(74) *Attorney, Agent, or Firm* — Spencer Fane LLP; Michael Bondi

(57) ABSTRACT

A reactor fluid supply system, a reactor system comprising such a fluid supply system, a method of supplying fluid into a reactor, and a method of operating a reactor system are provided. Preferably, the reactor system comprises a fluidised bed pyrolysis or combustion reactor and a fluid injector. The injector may comprise an internal flow passage extending from an inlet to an outlet, and have a first section including the inlet and a first portion of the passage and a second section including the outlet and a second portion of the passage. There may be a temperature regulator for controlling fluid temperature in the second section of the injector, the regulator comprising a cooling fluid jacket surrounding the second portion of the internal flow passage. The second section of the injector may be located inside the
(Continued)

reactor so that the outlet of the injector is positioned in the fluidised bed of the reactor.

20 Claims, 7 Drawing Sheets

(51) Int. Cl.
  *B01J 8/24* (2006.01)
  *C10B 49/10* (2006.01)
  *C10B 49/22* (2006.01)
  *C10B 53/07* (2006.01)
  *C10G 1/10* (2006.01)
  *F23C 10/04* (2006.01)

(52) U.S. Cl.
  CPC .............. *C10B 49/10* (2013.01); *C10B 49/22* (2013.01); *C10B 53/07* (2013.01); *F23C 10/04* (2013.01); *B01J 2208/00212* (2013.01); *C10G 2300/1003* (2013.01)

(58) Field of Classification Search
  CPC ............ B01J 2208/00212; C10B 49/10; C10B 49/22; C10B 53/07; C10B 21/12; C10B 53/00; F23C 10/04; F23C 10/22; F23C 10/005; F23G 5/0273; F23G 5/0276; F23G 5/12; F23G 2201/30; F23G 2201/40; F23G 2207/101; F23G 5/30; F23G 5/027; F23N 2225/14; F23N 2237/18; F23N 2241/18; Y02E 20/30; F23D 91/00; F23D 2214/00; Y02P 20/143
  USPC ........................................................ 422/146
  See application file for complete search history.

(56) References Cited

U.S. PATENT DOCUMENTS

| | | |
|---|---|---|
| 4,274,587 A | 6/1981 | Cioffi |
| 4,865,542 A | 9/1989 | Hasenack |
| 5,934,206 A | 8/1999 | Saxon |
| 2013/0192139 A1 | 8/2013 | Stevenson |

FOREIGN PATENT DOCUMENTS

| | | |
|---|---|---|
| DE | 2644146 A1 | 4/1978 |
| DE | 29822639 U1 | 9/1999 |
| EP | 0345467 A1 | 12/1989 |
| JP | H06174215 A | 6/1994 |
| JP | 2001227733 A | 8/2001 |
| JP | 2004061025 A | 3/2004 |
| WO | 2012034141 A1 | 3/2012 |
| WO | 2016/016094 A1 | 2/2016 |

OTHER PUBLICATIONS

CN-103756696 A—machine (Year: 2024).*
International Search Report received in Application Serial No. PCT/GB2020/052594 on Jan. 14, 2021, 4 pgs.
Examination Report dated Jun. 2, 2023 for Application No. GB1914985.5, 3 pgs.
Examination Report for Application No. GB1914985.5 dated Apr. 14, 2020, 4 pgs.
Examination Report of the European Patent Convention for European Patent Application No. 20793783.0, dated Feb. 22, 2024.

* cited by examiner

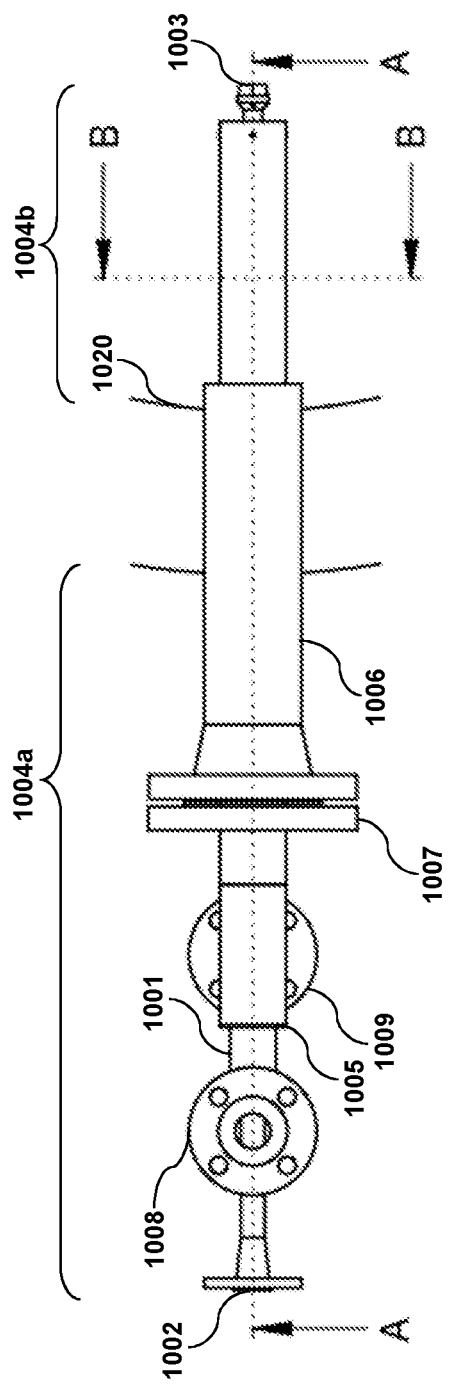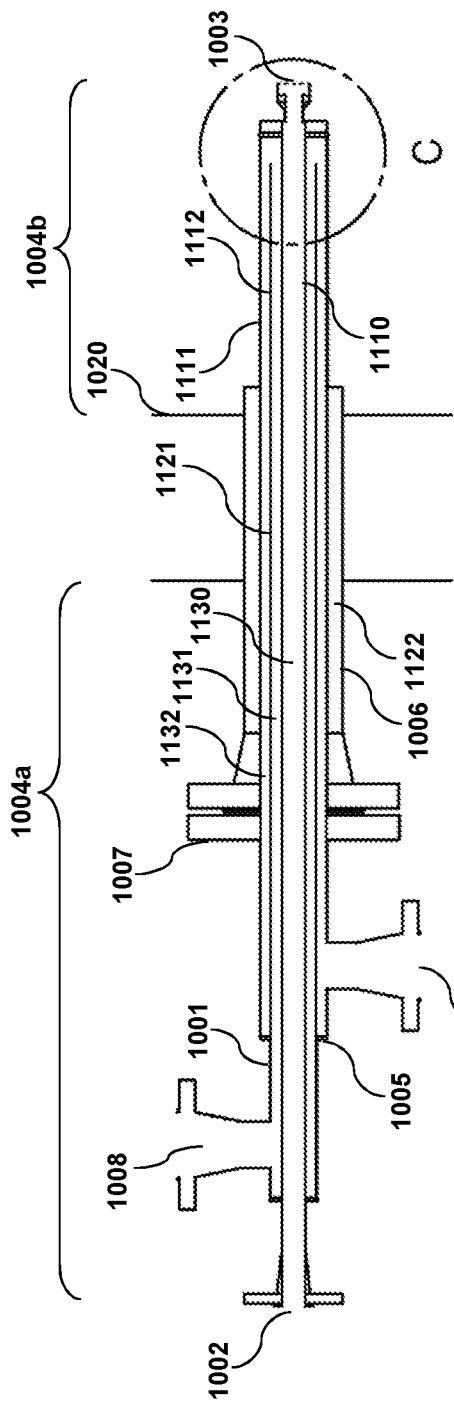
Fig. 10
Fig. 11

REACTOR FLUID SUPPLY SYSTEMS

FIELD OF THE INVENTION

The present invention concerns a reactor fluid (e.g. fuel) supply system, such as for a reactor comprised in apparatus suitable for pyrolysis of a carbonaceous feed material, such as waste material. For example, the apparatus may be suitable for recycling plastic waste, municipal waste, and/or biomass by pyrolysis. More particularly, but not exclusively, this invention concerns a fluid (e.g. fuel) injector system for a combustion reactor, such as a fluidised bed combustion reactor. The invention also concerns a method of injecting fluid (e.g. fuel), such as light hydrocarbon fuel, into a combustion reactor. Additionally or alternatively, the invention concerns a fluid injector system for a pyrolysis reactor, such as a fluidised bed pyrolysis reactor, and a method of injecting fluid (e.g. feedstock) into a pyrolysis reactor.

BACKGROUND OF THE INVENTION

There is an increasing awareness of the need to find cost-effective, efficient and effective methods of extracting useful products from solid carbonaceous materials, especially waste materials. In recent years, it has become apparent that not only is there a need to reduce pollution (often resulting from ineffective waste collection and processing), but also that waste is a valuable resource. This is particularly true of plastic waste. In many countries, mixed waste material is collected and taken to processing centres or recycling centres. Some categories of waste are separated out and sent to recycling processes, either at the centre or elsewhere. For example, waste glass is commonly recycled. Waste that is not recycled may be sent to landfill or may be burnt, typically to provide either heat or electrical energy. Other waste streams (including for example waste produced by industry and/or agriculture) are in some cases sent directly to landfill or to be burnt without any attempt to recover potentially valuable materials.

Plastic waste makes up a significant proportion of waste materials, especially of mixed waste materials. A large quantity of mixed plastic waste is continually passing through recycling centres. While recycling processes exist that are capable of making good use of certain types of plastic, such as polyethylene terephthalate (PET) and high-density polyethylene (HDPE), many plastics and composite materials are often more difficult to recycle and so have traditionally been sent to landfill. In many countries, governments have in recent years imposed limits on the amount of material than can be sent to landfill. However, in many cases, including countries throughout Europe, existing plastic recycling infrastructure does not have the capacity to handle the large volumes of plastic waste collected and separated from other waste in municipal recycling centres. As a result, large amounts of plastic waste are sent overseas for processing, incurring cost for the waste collector and causing the originating country to lose out on a resource that could be better used. Furthermore, the receiving country may not itself have adequate facilities for recycling such waste materials, and so in many cases such waste sent overseas can end up in landfill, or simply dumped in the environment.

Even plastic waste streams traditionally considered to be more uniform, such as plastic waste from industrial processes, are often under-recycled. Such industrial plastic waste streams include, for example, composite materials, poorly recycled plastics such as polystyrenes and polyvinylchlorides, and rubbers (such as used/surplus tyres). Some solutions have been proposed for waste plastic. For example, plastic waste may be used as a fuel in a power station. However, the cost of electricity generated in such a way may be many times the cost of electricity generated from a conventional fossil fuel, such as natural gas. It may also be difficult to use all the heat produced in such processes and much of it is therefore dissipated in cooling towers. Furthermore, burning plastic waste takes the material out of the 'circular economy' because it typically prevents any further recycling of the material and may result in significant carbon emissions. The combination of low efficiency, high capital cost and limited 'green' credentials can make such solutions unattractive.

Pyrolysis of mixed plastics has been suggested as a solution. Examples include the use of pyrolysis to create an oil or wax that can be processed to create fuel, lubricants and/or new plastics. A challenge with such processes is that mixed plastics are by their nature highly variable in their composition, which can lead to significant variations in pyrolysis product quality and properties over time. Sorting plastic waste to produce a relatively uniform feed is typically prohibitively expensive, and often not possible in the case of many composite materials. PCT Publication No. WO2014/128430A1 (Recycling Technologies) discloses a process and apparatus for the treatment of waste comprising Mixed Plastic Waste. The process comprises feeding the waste to a pyrolysis reactor, and pyrolysing the waste in the pyrolysis reactor to produce a pyrolysis product. The pyrolysis may be carried out in a fluidised-bed pyrolysis reactor. The temperature and residence time of material in the reactor is controlled in dependence on an attribute of the pyrolysis product, such as hydrocarbon chain length. Thus, WO2014/128430A1 allows for the use of a variable Mixed Plastic Waste feed by using feedback control based on the nature of the pyrolysis product.

PCT Publication No. WO 2018/000050 A1 discloses a process for treating mixed plastic waste comprising pyrolysing the waste in a pyrolysis reactor (such as a fluidised bed pyrolysis reactor) to produce a fuel and using the fuel to run a generator to produce electricity. Particulate material of the fluidised bed is heated in a fluidised bed heater supplied with a fuel, thus providing a dual bed reactor system where particulate material is circulated between a fluidised bed pyrolysis reactor and a fluidised bed heater. Pyrolysis processes have also been used for other carbonaceous material streams, such as biomass.

When utilising a fluidised bed heater to provide heated particulate material to a fluidised bed pyrolysis reactor, it is often necessary to heat particulate material in the heater to a high temperature, for example to allow for heat loss as the particulate material is transferred between the reactors and to provide thermal energy for pyrolysis.

A commonly used fluidised bed reactor system design is a so-called circulating fluidised bed reactor, such as that shown schematically in FIG. 1. The reactor system comprises a pyrolysis reactor 101, and a riser combustor 102. The pyrolysis reactor includes fluidised bed zone 103 and in use is supplied with a feed material via an inlet (not shown in FIG. 1). Particulate material is fluidised in the fluidised bed zone 103 by a fluidising gas fed into the pyrolysis reactor 101 by a gas distributor (not shown) at the bottom of the fluidised bed zone. During use, particulate material is withdrawn from the pyrolysis reactor via withdrawal line 104 and transported to the bottom of the riser combustor 102. Fuel and air are introduced into the lower end of the riser combustor through inlet lines 105, 106. The fuel burns, and the particulate material is heated, as the mixture of particulate material, fuel and air moves upwardly through the riser combustor 102. At the top end of the riser combustor, carrier gas and combustion products are removed through outlet line 107, and heated particulate material returns to the pyrolysis reactor 101 via return line 109. It is important to have a riser combustor of sufficient height to effect complete combustion of the fuel/adequate heating of the particulate material. In a riser combustor, the fuel, particulate material and oxygen are transported together, increasing in temperature as they travel. Thus, temperature at the fuel injection point is relatively low, and the particulate material is brought into intimate contact with the fuel as it burns, providing efficient heat transfer.

Another approach is to utilise a bubbling fluidised bed combustion reactor, such as that shown schematically in FIG. 2. The fluidised bed combustion reactor 201 includes a fluidised bed zone 203 in which particulate material is fluidised by a fluidising gas supplied into the reactor 201 via supply line 204 and distributor 205. The headspace above the fluidised bed zone 203 forms a freeboard zone 230. During use, the particulate material circulates between a fluidised bed pyrolysis reactor (not shown in FIG. 2) and the fluidised bed combustion reactor 201. To heat the particulate material, a mixture of fuel and air are supplied to a burner 202 below the fluidised bed. The burner acts to heat the fluidising gas that passes upwards through the bed, thereby transferring heat to the particulate material of the bed. Combustion products collect in the headspace and are removed from the freeboard zone 230 via an outlet line (not shown). In comparison to a riser combustor system, a bubbling bed combustor system may be able to heat a comparable quantity of particulate material in a reactor having a considerably smaller height, thereby saving space. However, with the burner positioned below the fluidised bed, heat transfer to the particulate material is relatively inefficient, and so it is often necessary to configure the burner to heat the fluidising gas to a temperature higher than the temperature desired in the fluidised bed. Temperatures as high as 1100° C. may be necessary to provide a bed temperature of 850° C. Such high fluidising gas temperatures can increase the cost and complexity of reactor design, for example necessitating the use of relatively expensive materials resistant to high temperatures in the burner zone. Furthermore, such high flame temperatures can lead to the formation of unwanted nitrous oxides (NOx) in the air around the burner.

A further challenge in providing an effective waste material recycling process is in logistics. Often, feedstocks are relatively low-value, and typically quite low density. Furthermore, even after processing, waste streams are typically contaminated by significant amounts of debris and water. Some approaches to waste material recycling have focused on the design of large-scale equipment capable of processing tens, or hundreds, of thousands of tonnes of mixed waste per year. Such centralised facilities often require many hundreds of heavy goods vehicle movements per year, and necessarily cover a very large catchment area (thus requiring the transport of low value waste material over large distances). It will be appreciated that a challenge in providing effective processes for recycling waste material is the need to provide equipment that can be cost-effectively manufactured, operated and maintained on an appropriate scale. A particular challenge is how to mass-produce medium-scale equipment capable of handling a 5,000-50,000 tonnes of waste material, such as plastic waste, per year.

There remains a need for economic and effective processes for (re)heating fluidised bed material, for example in a combustion reactor, especially where such heated fluidised bed material is used to provide thermal energy to a pyrolysis reactor. There also remains a need for an improved reactor fuel supply system, such as a fuel supply system capable of supplying fuel to a fluidised bed combustion reactor. There also remains a need for an improved reactor fluid feedstock supply system, such as a feedstock supply system capable of supplying fluid feedstock to a fluidised bed pyrolysis reactor. There also remains a need to provide cost-effective, medium scale waste recycling apparatus.

The present invention seeks to mitigate the above-mentioned problems. Alternatively or additionally, the present invention seeks to provide an improved process and fuel supply apparatus for a combustion reactor, such as fluidised bed combustion reactor. Additionally or alternatively, the present invention seeks to provide an improved process and feedstock supply apparatus for a pyrolysis reactor, such as fluidised bed pyrolysis reactor.

SUMMARY OF THE INVENTION

According to a first aspect, the present invention provides an injector for supplying fluid into a fluidised bed reactor, wherein the injector comprises an internal flow passage extending from an inlet to an outlet, the injector having a first section including the inlet and a first portion of the internal flow passage, and a second section including the outlet and a second portion of the internal flow passage, wherein the injector is configured so that, when the injector is connected to the fluidised bed reactor and the injector and the fluidised bed reactor are in use, the second section of the injector is located inside the reactor and extends into the fluidised bed, and wherein the injector additionally comprises a temperature regulator for controlling fluid temperature in at least the second section of the injector. Optionally the injector is a fuel injector and the fluid is a fuel. Optionally, the fluidised bed reactor is a fluidised bed combustion reactor. Optionally, the fluidised bed is a bubbling fluidised bed. It will be understood that a combustion reactor is a reactor configured to combust a material, such as fuel, in the presence of oxygen (for example an oxygen-containing gas), thereby generating heat. Optionally, the fluidised bed reactor is a fluidised bed pyrolysis reactor. It will be understood that a pyrolysis reactor is a reactor configured to pyrolyse a feedstock, thereby producing a pyrolysis product (for example, a fuel such as a light hydrocarbon gas). Pyrolysis may be performed in the absence of oxygen, or in the presence of only trace amounts of oxygen.

As used herein, the term fuel refers to material fed into a combustion reactor, for example a fluidised bed combustion reactor, and the term feedstock refers to material fed into a pyrolysis reactor, for example a fluidised bed pyrolysis reactor.

As used herein, light hydrocarbons are $C_1$ to $C_6$ hydrocarbons, for example $C_3$ to $C_6$ hydrocarbons. Medium hydrocarbons are $C_7$ to $C_{19}$ hydrocarbons. Heavy hydrocarbons are hydrocarbons having a carbon number of $C_{20}$ or higher, for example $C_{20}$ to $C_{70}$ hydrocarbons, such as $C_{20}$ to $C_{60}$ hydrocarbons, e.g. $C_{20}$ to $C_{50}$ hydrocarbons. An example heavy hydrocarbon is so-called 'paraffin wax'. It will be understood that light, medium and/or heavy hydrocarbons may be present as a mixture. An example of a mixture of medium and heavy hydrocarbons is so-called 'slack wax'.

Optionally, fuel comprises or consists essentially of light, medium and/or heavy hydrocarbons. Preferably, fuel comprises or consists essentially of light and/or medium hydrocarbons, such as light hydrocarbons. Optionally, feedstock comprises or consists essentially of light, medium and/or heavy hydrocarbons. Preferably, feedstock comprises or consists essentially of medium and/or heavy hydrocarbons, such as heavy hydrocarbons. It will be appreciated fuel may, for example, comprise a pyrolysis product, such as material produced in a pyrolysis reactor as described herein. For example, fuel may optionally comprise one or more light, medium or heavy hydrocarbon portions of pyrolysis product, such as light or medium hydrocarbon portions, e.g. a light hydrocarbon portion. It will be further appreciated that feedstock may, for example, comprise a pyrolysis product, such as material produced in a pyrolysis reactor as described herein. For example, at least a portion of pyrolysis product is optionally recycled to the pyrolysis reactor, such as medium or heavy hydrocarbons, e.g. heavy hydrocarbons.

It will be understood that when an injector extends into a fluidised bed, the outlet of the injector is positioned within the bed (understood to be within the body of the bed). Thus, the outlet of the injector is located in the bed at a position spaced apart from the edge of the bed. The fluidised bed may be contained within a reactor shell. It will be appreciated that a reactor shell may include one or more of the bottom-, top- and side-walls of the reactor, and may define an internal space within which a fluidised bed is established when the reactor is in use. At least part of the inner surface of the reactor shell is typically in contact with particulate material of the fluidised bed in the fluidised bed zone, and defines an edge of the fluidised bed. Thus, the outlet of the injector may be spaced apart from the inner surface of the reactor shell when the injector is connected to the reactor. Optionally, when the injector is connected to the reactor, the injector passes through an opening in the reactor shell. It will also be understood that when the injector and the reactor are in use, substantially all of the second section of the injector is brought into contact with particulate material forming the fluidised bed. It will be understood that located inside the reactor means located inside of the inner surface of the reactor. For example, if the reactor shell includes a coating (such as a refractory coating) on its inner surface, the inner surface of the reactor is the inner surface of the refractory coating. As used herein, a refractory material is a heat resistant mineral material. Non-limiting examples of suitable refractory materials include alumina-based and/or silica-based and/or magnesia-based materials.

Typically, fuel is burnt in a fluidised bed combustion reactor both to heat and to regenerate the particulate material contained therein. Often, feedstock is pyrolysed in a fluidised bed pyrolysis reactor to convert a heavier hydrocarbon feedstock to a lighter hydrocarbon pyrolysis product. For example, the combustion reactor may be part of a dual fluidised bed reactor system, the combustion reactor working in tandem with a fluidised bed pyrolysis reactor, particulate material forming the fluidised beds being circulated between the reactors. In such a system, particulate material fed to the combustion reactor may be contaminated with char that should be removed before the particulate material is returned to the pyrolysis reactor. Additionally or alternatively, it may be that the particulate material is used to provide heat in the pyrolysis reactor. A relatively high temperature may be desirable in the combustion reactor to burn char contaminants (e.g. when waste plastic material is pyrolysed in the pyrolysis reactor), such as a temperature of at least 750° C., for example at least 850° C. Additionally or alternatively, a high temperature may be desirable in the combustion reactor to allow for heat loss as particulate material is transported to the pyrolysis reactor. While char burnt in the combustion reactor may serve to heat the particulate material, often a supplementary fuel is burnt in the combustion reactor to supply additional heat. Advantageously, the fuel injector of the first aspect of the invention allows fuel to be supplied directly into the fluidised bed. It will be understood that the fuel outlet is thus located in the body of the fluidised bed when the reactor is in use. It will be appreciated that the reactor is in use when particulate material contained in the reactor is maintained in a fluidised state, and the fluidised bed is at its operating temperature. When the injector is operated with the fluid outlet located in the body of the fluidised bed, fuel ignites upon exiting the outlet, and the resulting flame is brought into immediate and intimate contact with the particulate material. Additionally, flow currents within the fluidised bed rapidly disperse the flame, which may help to avoid a build-up of excessive temperature in a single location. Yet further, the fluidised bed may act to insulate the reactor shell from the flame, for example because the hottest part of the fluidised bed may be towards the interior of the bed, and away from its edges. However, the present inventors have found that such an arrangement is challenging because the section of the fuel injector protruding into the fluidised bed is exposed to a high temperature, thereby risking overheating of the fuel in that part of the injector. In some cases, this can result in the fuel temperature in the injector exceeding the thermal decomposition temperature of the fuel. For example, $C_3$ (propane/propylene) fuels undergo thermal cracking at temperatures above about 450° C. Providing a temperature regulator may allow convenient control of fuel temperature in the injector. Similarly, the fluid injector of the first aspect of the invention advantageously allows fluid to be supplied directly into the fluidised bed of a pyrolysis reactor. When the fluid outlet of such an injector is located in the body of the fluidised bed, feedstock fluid is rapidly heated by immediate and intimate contact with particulate material, efficiently initiating pyrolysis and avoiding deposition of feedstock on other reactor components (such as inner surfaces of the reactor shell). Additionally, flow currents within the fluidised bed rapidly disperse feedstock, improving bed efficiency. Feedstock temperature control in the injector may also be facilitated by the temperature regulator, if present.

Optionally, the fuel is a light hydrocarbon fuel, such as a fuel comprising $C_3$ to $C_6$ hydrocarbons. Optionally, the fuel comprises $C_3$ hydrocarbons, such as propane and propylene. Optionally the fuel is liquefied petroleum gas (LPG). Optionally, the majority of the fuel by volume and/or weight is $C_3$ hydrocarbons, based on the total volume or weight of the fuel. For example, at least 75%, such as at least 95%, of the fuel by volume and/or weight is $C_3$ hydrocarbons, based on the total volume or weight of the fuel. Additionally or alternatively, the fuel is optionally a pyrolysis product produced in a pyrolysis reactor by pyrolysis of a feed material.

Optionally, the feedstock is a medium or heavy hydrocarbon feedstock, such as a feedstock comprising $C_7$ to $C_{70}$ hydrocarbons. Optionally, the majority of the feedstock by volume and/or weight is $C_{20}$ to $C_{70}$ hydrocarbons, such as $C_{20}$ to $C_{60}$ hydrocarbons, e.g. $C_{20}$ to $C_{50}$ hydrocarbons, based on the total volume or weight of the fuel. For example, at least 75%, such as at least 95%, e.g. all of the feedstock by volume and/or weight is $C_{20}$ to $C_{70}$ hydrocarbons, such as $C_{20}$ to $C_{60}$ hydrocarbons, e.g. $C_{20}$ to $C_{50}$ hydrocarbons, based on the total volume or weight of the feedstock. Optionally, the feedstock has a boiling point of at least 350° C. For example, the feedstock has a T95 boiling point in the range 350 to 450° C. The T95 boiling is defined as the temperature at which 95 wt % of the feed will boil. It will be appreciated that the feedstock may optionally include material with a boiling point greater than 450° C. Optionally, the feedstock is or may comprise a pyrolysis product produced in the pyrolysis reactor by partial pyrolysis of another feedstock. For example, the pyrolysis reactor may additionally be fed by a heavier carbonaceous material (such as plastic waste), and the pyrolysis product separated into light hydrocarbon and light-medium hydrocarbon streams, where the light-medium hydrocarbon stream is fed back to the pyrolysis reactor via the fluid injector. Additionally or alternatively, the feedstock is or may comprise a waste carbonaceous fluid, such as waste oil.

The temperature regulator may control fluid temperature in at least the second section of the injector by controlling the temperature of the second portion of the internal flow passage. More particularly, the temperature regulator may act as an insulator, insulating fluid in the second portion of the internal flow passage from the fluidised bed. Optionally, the temperature regulator is operable to maintain substantially all of the second portion of the internal flow passage at a temperature of 100° C. or less, such as 75° C. or less, for example 50° C. or less. Optionally, the temperature regulator is operable to maintain substantially all of the second portion of the internal flow passage at a temperature of from 10° C. to 100° C., such as from 15° C. to 80° C., for example from 20° C. to 60° C. Optionally, the temperature regulator is operable to maintain fluid temperature in the second section of the injector in the range of from 10° C. to 100° C., such as from 15° C. to 75° C., for example from 20° C. to 50° C. Optionally, the injector is suitable for use with a fluidised bed having an operating temperature of up to 1050° C., such as up to 950° C., for example an operating temperature of from 600° C. to 1050° C., such as from 750° C. to 1000° C., for example from 850° C. to 950° C. It will be understood that flow rate of fluid through the injector will typically also affect fuel temperature in the second section of the injector. For example, at high fluid flow rates, higher temperatures may be tolerated in the second section of the injector (since the fluid may exit the injector before it exceeds the upper fluid temperature limit, e.g. 100° C., or 80° C., or 60° C.). The operator will be able to select an appropriate temperature regulator cooling capacity based on desired fluid flow rate.

Optionally, the fuel injector is suitable for use with a fluidised bed reactor operating at a pressure of from 0.1 to 2 barg, such as from 0.2 to 1 barg, for example 0.3 to 0.5 barg. It will be understood that reactor pressure is the pressure in the reactor freeboard zone.

Optionally, the injector is configured to supply fluid into a fluidised bed reactor at a rate of from 0.5 to 250 kg/h. For example, the injector may be configured to supply fuel into a fluidised bed reactor (such as a combustion reactor) at a rate of from 0.5 to 75 kg/h, such as from 1 to 50 kg/h, for example from 5 to 40 kg/h. Alternatively, the injector may be configured to supply feedstock into a fluidised bed reactor (such as a pyrolysis reactor) at a rate of from 5 to 250 kg/h, such as from 25 to 225 kg/h, for example from 50 to 200 kg/hr, such as 75 to 150 kg/h.

It will be appreciated that higher supply rates may be more appropriate for heavier hydrocarbon fluids, and/or lower supply rates may be more appropriate for lighter hydrocarbon fluids. For example, when the fluid comprises or consists essentially of light and/or medium hydrocarbons, the injector may optionally be configured to supply fluid into a fluidised bed reactor at a rate of from 0.5 to 75 kg/h, such as 1 to 50 kg/h. Alternatively, when the fluid comprises or consists essentially of heavy hydrocarbons, the injector may optionally be configured to supply fluid into a fluidised bed reactor at a rate of from 5 to 250 kg/h, such as 50 to 200 kg/h.

Optionally, the second section of the injector has a length of at least 75 mm, such as at least 150 mm, for example at least 250 mm. Optionally, the second section of the injector has a length of from 75 mm to 800 mm, such as from 150 mm to 600 mm, for example from 250 mm to 400 mm. Optionally, the second portion of the internal flow passage has a length of at least 75 mm, such as at least 150 mm, for example at least 250 mm. Optionally, the second portion of the internal flow passage has a length of from 75 mm to 800 mm, such as from 150 mm to 600 mm, for example from 250 mm to 400 mm. Optionally, the injector is configured so that, when the injector is connected to the fluidised bed reactor and the injector and the fluidised bed reactor are in use, the injector extends at least 75 mm, such as at least 150 mm, for example at least 250 mm, into the fluidised bed. Optionally, the injector is configured so that, when the injector is connected to the fluidised bed reactor and the injector and the fluidised bed reactor are in use, the injector extends 75 mm to 800 mm, such as 150 mm to 600 mm, for example 250 mm to 400 mm, into the fluidised bed. Optionally, the injector is configured so that, when the injector is connected to the fluidised bed reactor and the injector and the fluidised bed reactor are in use, the outlet of the injector is positioned no less than 75 mm, such as no less than 150 mm, for example no less than 250 mm, from an edge of the fluidised bed. For example, when the outlet of the injector is spaced apart at least 75 mm, such as no less than 150 mm, for example no less than 250 mm, from an inner surface of the reactor shell.

A fluidised bed zone of a reactor will be understood to have a bottom, a top and sides. Fluidising medium is typically introduced into the bottom of the fluidised bed zone, and the net direction of fluid flow through the fluidised bed is vertically from the bottom to the top. As used herein, the diameter of the fluidised bed zone (and thus the fluidised bed when the reactor is in use) is the distance from one side to the other, in a direction perpendicular to the net direction of fluid flow through the fluidised bed zone. Optionally, the fluidised bed zone has a cylindrical shape. As used herein, the fluidised bed diameter is the fluidised bed diameter in the plane containing the outlet of the injector when the injector is connected to the reactor and the injector and the reactor are in use. The height of the fluidised bed zone (and thus the fluidised bed when the reactor is in use) is the distance from the bottom of the zone to its top, with the bottom of the zone considered to be the position of the fluidising medium distributor when present. The space above the fluidised bed zone or known as the head space, or freeboard zone. Typically, combustion products are collected from the freeboard zone for removal from the reactor. Thus, the height is measured in a direction parallel to the net direction of flow of fluidising fluid through the fluidised bed. Optionally, the injector is configured so that, when the injector is connected to the fluidised bed reactor and the injector and the fluidised bed reactor are in use, the outlet is positioned at a distance of no less than Y/8, such as no less than Y/6, for example no less than Y/4, from any side of the fluidised bed (and/or from any inner surface of the reactor shell), where Y is the diameter of the fluidised bed measured in the plane of the outlet. Optionally, the injector is configured so that, when the injector is connected to the fluidised bed reactor, the second section of the injector extends a distance of from Y/8 to Y/2, such as Y/6 to Y/2.5, for example Y/4 to Y/3, into the fluidised bed zone, where Y is the diameter of the fluidised bed zone measured in the plane of the outlet.

It will be appreciated that the first section may be any convenient length. For example, the first and second sections may define the entire length of the injector, and the injector may have an overall length of from 0.8 to 2 m, such as 0.9 to 1.6 m, for example 1 to 1.4 m. The internal flow passage may extend along at least 90% of the length of the injector, such as at least 95%, for example along substantially the whole length of the injector. It will be appreciated that the temperature regulator may provide temperature control along any part of the first section, in addition to the second section.

Optionally, the internal flow passage of the injector has a substantially constant internal diameter along its length. Optionally, the internal flow passage of the injector has an internal diameter in the range of 8 mm to 40 mm, such as 10 mm to 30 mm, for example 12 mm to 20 mm.

Optionally, the injector comprises a connection portion (such as an attachment point) for connecting and attaching the injector to the reactor (such as to the reactor shell). Optionally, the connection portion is positioned on the first section of the injector. The connection portion may include any appropriate mounting system, such as a flange, bracket, rim etc., for facilitating connection to the reactor. The location of the connection portion may assist in defining the configuration of the injector when it is connected to the reactor.

Optionally, the injector comprises a nozzle defining the outlet, such as a nozzle comprising one or more openings (e.g. a plurality of openings). Optionally, each opening is sized to inhibit ingress of fluidised bed particulate material. The size of the openings may be selected in dependence on the size of the particulate material to be used in the fluidised bed. Optionally, the or each opening has a diameter of no more than 2.2 mm, such as a diameter of 1.2 to 2.2 mm. An opening having a diameter of no more than 2.2 mm may act as a flame arrester. Additionally or alternatively, the size of the openings may be selected in dependence on a desired pressure drop. It will be appreciated that interactions between the fluidised particulate material and the injected fluid reduce pressure across the bed. It will be understood that a pressure drop across the bed can be calculated, and that pressure drop across a nozzle depends on the diameter of the nozzle openings. Optionally, the or each nozzle opening has a diameter sized to induce a pressure drop in the range of from 5% to 50%, for example 8% to 40%, such as 10% to 30%, of the pressure drop across the bed. It may be that such pressure drops relative to the pressure drop across the bed help provide an even distribution of fluidising gas through the bed. It will be appreciated that the design of the nozzle may vary according to the nature of the fluid being injected. For example, an injector intended for supply of a heavier hydrocarbon fluid may have a larger nozzle diameter than an injector intended for supply of light hydrocarbon gasses.

Optionally, the temperature regulator comprises a cooling jacket, such as a cooling jacket configured to receive a cooling fluid. Optionally, the cooling jacket extends along the majority of the length of the second section of the injector, for example along at least 60%, such as at least 70%, of the length of the second section of the injector. It will be understood that the length of the second section includes the length of the nozzle, if present. It will be understood that the length of the second section may be length measured parallel to the longitudinal axis of the internal flow passage. Optionally, the cooling jacket substantially (e.g. entirely) surrounds at least a section of the second portion of the internal flow passage, for example the cooling jacket may substantially surround the second portion of the internal flow passage for the majority of its length, such as at least 60%, such as for at least 70%, for example at least 80%, of the length of the second portion of the internal flow passage. Optionally, the cooling jacket extends along and surrounds the second portion of the internal flow passage. The second portion of the internal flow passage may be understood to extend to the outlet of the injector, and thus may not include the nozzle if present.

Optionally, the cooling jacket is a flow-return cooling jacket, for example having a cooling fluid inlet and a cooling fluid outlet configured for connection to a fluid cooling system (e.g. comprising a fluid cooler). In use, a cooling fluid is circulated between the cooling jacket and the fluid cooler. Optionally, the fluid cooling system comprises a pump for circulating cooling fluid between the cooling jacket and the fluid cooler. Optionally, the cooling jacket is configured to receive a cooling fluid selected from water and oil, preferably water. Water may avoid or reduce safety risks, for example associated with cooling fluid leakage in or around the combustion reactor. Optionally, the fluid cooling system is operable to maintain a maximum cooling fluid temperature of no more than 100° C., such as no more than 80° C., for example no more than 60° C. It will be appreciated that in a flow-return cooling jacket, the maximum cooling fluid temperature is typically the temperature of the cooling fluid returned to the fluid cooler from the injector. Any suitable cooling jacket arrangement may be used, such as a twin pipe cooling jacket. Twin pipe cooling jacket designs are well known. Typically, a twin pipe cooling jacket comprises a small diameter pipe concentrically arranged within a large diameter pipe. For example, at least part of the internal flow passage of the injector may be defined by the small diameter pipe, while the cooling jacket is defined by the large diameter pipe. Baffles may be arranged in the space between the small and large diameter pipes to direct flow of cooling fluid along the cooling jacket. Baffles may be important when the fluid inlet and fluid outlet are provided at the same end of the cooling jacket, and cooling fluid is intended to reach the other end. A baffle may take the form of a wall bridging the gap between the small and large diameter pipes and extending lengthways through the cooling jacket alongside the internal flow passage of the injector. Additionally or alternatively, a baffle may take the form of a third pipe disposed between the small and large diameter pipes, optionally spaced apart from each by one or more brackets. It will be appreciated that a combination of baffle arrangements may be used.

Optionally, the cooling jacket is a flow-through cooling jacket. For example, the cooling jacket may be configured to receive a cooling fluid from a cooling fluid source and to discharge spent cooling fluid to a cooling fluid receiver. It will be appreciated that the maximum cooling fluid temperature for a flow-through cooling jacket is the temperature of the fluid discharged from the jacket. The cooling fluid receiver may be located outside the reactor, in which case the cooling jacket may be structurally similar/identical to a flow-return cooling jacket. Alternatively, the flow-through cooling jacket may be configured to discharge the cooling fluid into the reactor. For example, the cooling jacket may be in the form of a second internal flow passage, such as a second internal flow passage disposed around the first internal flow passage, the second internal flow passage being suitable for supplying a second fluid into the fluidised bed reactor. Optionally, the second internal flow passage extends from a second inlet in the first section of the injector to a second outlet in the second section of the injector. Optionally, the injector is suitable for co-feeding the fluid together with the second fluid. Optionally, the second fluid is an inert gas, an oxygen containing gas (such as air) or water. It will be understood that the second fluid in the second flow passage insulates the fluid in the flow passage from the heat of the fluidised bed. Optionally, the internal flow passage is defined by a small diameter pipe, and the second internal flow passage is defined by a large diameter pipe, the small and large diameter pipes being concentrically arranged. Optionally, the second outlet comprises one or more nozzles, each nozzle optionally comprising a plurality of openings. Optionally, each opening is sized to inhibit ingress of fluidised bed particulate material. It will be understood that the flow rate and the temperature of the second fluid along the second internal flow path is important to temperature control of the fluid in the internal flow path. The flow rate, temperature and composition of the second fluid (especially the oxygen content of the second fluid when it is an oxygen containing gas) can be selected in dependence on the maximum temperature permitted for the fluid in the internal flow path and the operating temperature of the fluidised bed. Optionally, the injector is configured to be supplied with a cooled second fluid, for example provided by a fluid cooler.

Optionally, for example when the injector is configured for use in a combustion reactor, the injector comprises a combustion sensor positioned on the second section, preferably proximate the outlet. Optionally, the combustion sensor is configured to detect combustion of fuel in the fluidised bed proximate the outlet. Such a sensor may be particularly important when the injector is used to supply fuel into the fluidised bed. Typically, fuel supplied into a fluidised bed reactor that is not combusted in the fluidised bed collects in the head space above the fluidised bed (also known as the reactor freeboard). Collection of fuel in the head space may present a safety risk, and/or may inadvertently pass from the combustion reactor to other parts of the reactor system. Thus, it is useful for the operator to be able to determine whether or not fuel supplied by the injector is combusted immediately upon entry into the fluidised bed. Optionally, the combustion sensor comprises a temperature sensor, such as a temperature sensor configured to determine the temperature of the fluidised bed adjacent the second section of the injector, such as adjacent the injector outlet. It will be understood that maintaining the fluidised bed at a temperature above the auto ignition temperature of fuel supplied via the injector may ensure that fuel is combusted in the fluidised bed. Having such a temperature sensor may be particularly useful if the fuel is of variable composition (and thus of variable auto ignition temperature). Additionally or alternatively, determining an increase in fluidised bed temperature as fuel is supplied into the fluidised bed may indicate that fuel is being combusted in the fluidised bed. Optionally, the temperature sensor is a thermocouple or infra-red (IR) temperature sensor. It will be appreciated that the auto ignition temperature of a fuel is its auto ignition temperature under the conditions in the fluidised bed, for example at the oxygen concentration of the fluidised bed. Additionally or alternatively, the combustion sensor comprises an oxygen analyser, such as an oxygen analyser configured to determine the oxygen content of the fluidised bed adjacent the second section of the injector, such as adjacent the injector outlet. It will be understood that a low oxygen content in the fluidised bed may lead to incomplete combustion of fuel in the bed.

Optionally, for example when the injector is configured for use in a combustion reactor, the injector comprises an ignition electrode positioned on the second section, preferably proximate the outlet. Optionally, the ignition electrode is configured to ignite fuel supplied into the fluidised bed via the injector. An ignition electrode may be useful, for example, when fuel is injected into the fluidised bed before the fluidised bed reaches the auto ignition temperature of the fuel, such as during start-up of the reactor. Having an ignition electrode may be particularly useful if the fuel is of variable composition.

Optionally, the injector comprises a sleeve for attachment of the injector to the reactor. For example, the sleeve may be configured to be received by, and optionally attached to, an opening in the reactor, wherein the first section of the injector is configured to be received by, and optionally attached to, the sleeve. Optionally, the injector comprises an insulating layer disposed between the sleeve and the first section of the injector.

At least a portion of the part of the injector arranged to intrude into the fluidised bed during use comprises a layer of refractory material on its outer surface, such as a refractory material provided as a sacrificial coating that acts to protect the underlying metal (e.g. steel) wall of the injector. Such a refractory coating may be replaceable during maintenance of the injector. Optionally, such a refractory material is positioned at the end of the injector.

According to a second aspect, the present invention provides a reactor system comprising a fluidised bed reactor and injector of the first aspect of the invention, wherein the second section of the at least one injector is located inside the reactor and extends into the fluidised bed zone. Optionally, the reactor system comprises a plurality of injectors so arranged. Optionally, the fluidised bed reactor comprises a reactor shell, the reactor shell having an opening through which the or each injector passes. Optionally, the or each injector extends from said opening in a direction perpendicular to the net direction of fluid flow through the fluidised bed zone, for example in a horizontal direction. Optionally, the or each injector extends towards the central longitudinal axis of the fluidised bed zone. It will be understood that the central longitudinal axis is the axis extending from the bottom of the fluidised bed to the top, equidistant the opposing sides. Optionally, the reactor shell comprises a plurality of said openings arranged in a plane extending in a direction perpendicular to the net direction of fluid flow through the reactor, optionally wherein the reactor comprises a plurality of injectors each extending across said plane. Optionally, the plurality of openings through which the injectors pass, are distributed evenly around the circumference of the reactor shell in a plane perpendicular to the net direction of fluid flow through the reactor. Optionally, the reactor shell comprises a plurality of said openings arranged in a plurality of planes extending in a direction perpendicular to the net direction of fluid flow through the reactor, optionally wherein the reactor comprises a plurality of injectors each extending across each said plane. Optionally, the plurality of openings through which the injectors pass, are distributed evenly around the circumference of the reactor shell in each plane perpendicular to the net direction of fluid flow through the reactor.

Optionally, the reactor is a fluidised bed combustion reactor. Optionally, the reactor is a fluidised bed pyrolysis reactor.

Optionally, the reactor comprises at least one temperature sensor for measuring temperature in the reactor, for example in the fluidised bed zone and/or in the freeboard zone. Said at least one temperature sensor may be in addition to, or alternative to, any temperature sensor provided on the injector(s). Optionally, the at least one temperature sensor is an intrusive temperature sensor. It will be understood that an intrusive temperature sensor extends into the zone for which the temperature is measured. Optionally, the at least one temperature sensor is positioned in a plane extending in a direction perpendicular to the net direction of fluid flow through the reactor, the plane also containing the outlet of at least one injector. Optionally, the at least one temperature sensor passes through an opening in the reactor shell. Optionally, the opening through which the temperature sensor passes, and the one or more openings through which the one or more injectors pass, are distributed evenly around the circumference of the reactor shell in a plane perpendicular to the net direction of fluid flow through the reactor.

Optionally, for example when the reactor is a combustion reactor, the reactor comprises at least one oxygen analyser for measuring oxygen concentration in the reactor, for example in the fluidised bed zone and/or in the freeboard zone, preferably in the freeboard zone. Said at least one oxygen analyser may be in addition to, or alternative to, any oxygen analyser provided on the injector(s). Optionally, the at least one oxygen analyser is an intrusive oxygen analyser. It will be understood that an intrusive oxygen analyser extends into the zone for which the oxygen concentration is measured. Optionally, the at least one oxygen analyser is positioned in a plane extending in a direction perpendicular to the net direction of fluid flow through the reactor, the plane also containing the outlet of at least one injector. Optionally, the at least one oxygen analyser passes through an opening in the reactor shell. Optionally, the opening through which the oxygen analyser passes, and the one or more openings through which the one or more injectors pass, are distributed evenly around the circumference of the reactor shell in a plane perpendicular to the net direction of fluid flow through the reactor. Optionally, the reactor comprises at least one pressure sensor for measuring pressure in the reactor, for example in the fluidized bed zone and/or in the freeboard zone, preferably in the freeboard zone.

It will be understood that any sensor described as measuring a parameter in the freeboard zone (e.g. temperature, pressure and/or oxygen concentration, especially pressure and/or oxygen concentration) may be positioned in the freeboard zone, or in an outlet from the freeboard zone, such as an outlet for removing gasses (e.g. combustion gasses) from the reactor. It will be understood that multiple different sensors may be mounted as a sensor array on a common support. For example, temperature and/or gas and/or pressure sensors may be mounted together at the same position in the reactor.

The reactor optionally includes a refractory material, such as a refractory material provided as a sacrificial coating on its inner surface protecting the underlying metal (e.g. steel) wall of the reactor. Such a refractory coating may be replaceable during maintenance of the reactor.

Optionally, the reactor comprises a distributor for supplying fluidising fluid into the fluidised bed zone. Optionally, the fluidising fluid is an oxygen-containing fluidising fluid, such as air. Optionally, the distributor defines the bottom of the fluidised bed zone. Optionally, the outlet of the or each injector is positioned at least 100 mm, such as at least 175 mm, for example at least 250 mm from the bottom of the fluidised bed zone (e.g. from the distributor). Optionally, the reactor and the injector are configured so that the outlet of the or each injector is positioned at a distance of 100 mm to 600 mm, such as 175 mm to 450 mm, for example 250 mm to 300 mm from the bottom of the fluidised bed zone. Optionally, the outlet of the or each injector is positioned at a distance of from $Z/8$ to $Z/2$, such as $Z/6$ to $Z/3$, such as $Z/5$ to $Z/4$, from the bottom of the fluidised bed zone, wherein $Z$ is the height of the fluidised bed zone. Optionally, the height of the fluidised bed zone is from 1 to 4 m, such as 1.5 to 3 m, for example 2 to 2.5 m. Optionally, the diameter of the fluidised bed zone in the plane of the outlet of the injector is 0.5 to 2.5 m, such as 0.75 to 2 m, for example 1 to 1.5 m. Optionally, the fluidised bed zone has a substantially constant diameter along its height. Relatively small dimensions height may be important for transport of the reactor.

Optionally, the reactor system comprises a fluid supply manifold for controlling supply of fluid to the or each injector. It will be understood that the manifold may take any form. For example the manifold may be a single device comprising a plurality of valves each regulating a separate fluid supply and connected to a common line to the injector. Alternatively, the manifold may be a collection of separate devices, for example separate such valves linked to the injector by a plurality of lines. Optionally, the fluid supply manifold is configured to control supply of a first fluid and a second fluid to the or each injector, for example wherein the first fluid is an inert gas (such as nitrogen) and the second fluid is a fuel (or a feedstock). Optionally, the fluid supply manifold is operable to purge the or each injector of fuel (or feedstock) with inert gas, for example during shut down of the reactor and/or when fuel (feedstock) is no longer required in the fluidised bed. Optionally, the reactor is configured to receive as the fuel (or feedstock) a pyrolysis product from a pyrolysis reactor, optionally wherein the fluid supply manifold is configured to receive said pyrolysis product. For example, when the reactor system is a combustion reactor in a dual fluidised bed reactor apparatus additionally comprising a pyrolysis reactor, the fuel is a pyrolysis product (e.g. a light hydrocarbon gas fraction) produced by pyrolysis of a feed material in the pyrolysis reactor. Additionally or alternatively, when the reactor system is a pyrolysis reactor, the fuel is a portion of the pyrolysis product (e.g. a light-medium or medium hydrocarbon gas fraction) produced by pyrolysis of a feed material in the pyrolysis reactor.

Optionally, for example when the reactor is a combustion reactor, the fluidised bed reactor comprises an auxiliary heater, such as a burner, for providing auxiliary heat to the fluidised bed zone. For example, the auxiliary heater is disposed below the fluidised bed zone (e.g. below the distributor) to heat the fluidised bed zone. For example, the auxiliary heater is an under-bed burner. Optionally, the auxiliary heater is configured to burn a fuel in a space under the fluidised bed zone, thereby heating particulate material in the fluidised bed when the reactor is in use. Such an auxiliary heater may be particularly useful during start-up of the reactor, for example to heat the fluidised bed to a temperature at or above the auto ignition temperature of fuel to be supplied into the fluidised bed zone via the injector(s). Additionally or alternatively, the reactor system optionally comprises a fluidising fluid heater for heating fluidising fluid prior to its supply into the reactor via the distributor. It will be understood that providing heated fluidising fluid may also assist in heating the fluidised bed. It will be understood that the auxiliary heater may also function as a fluidising fluid heater.

Optionally, the reactor system comprises a control system, such as a control system configured to communicate with one or more reactor temperature sensors. Optionally, the one or more temperature sensors include one or more temperature sensors for measuring temperature in the fluidised bed zone and/or the freeboard zone (such as one or more intrusive temperature sensors) and/or one or more temperature sensors provided on the injector(s). Optionally, the control system is configured to control operation of the fluidising fluid supply system and/or the auxiliary heater (if present) and/or the fluidising fluid heater (if present) in dependence on the temperature measured by said one or more temperature sensors. Optionally, the control system is configured to control operation of the or each injector in dependence on the temperature measured by said one or more temperature sensors. Optionally, when the injected fluid is a fuel (or a feedstock), the method comprises supplying fuel (or feedstock) with the injector only when the reactor temperature falls within pre-determined limits. For example, fuel (or feedstock) flow is prevented when the fluidised bed temperature and/or the freeboard temperature is below a minimum temperature threshold TT1, and/or when the fluidised bed temperature and/or the freeboard temperature is above a maximum temperature threshold TT2. Preferably, when the reactor is a combustion reactor, TT1 is at or above the auto ignition temperature of the fuel, and/or TT2 is at or below the maximum design temperature of the fluidised bed reactor. Preferably, when the reactor is a pyrolysis reactor, TT1 is at or above the cracking temperature of the feedstock, and/or TT2 is below the temperature at which excessive cracking of feedstock would be expected. Optionally, e.g. when the reactor is a combustion reactor, TT1 is in the range of from 450° C. to 650° C., such as 500° C. to 600° C., and TT2 is in the range of from 800° C. to 1100° C., such as 815° C. to 1050° C. Optionally, e.g. when the reactor is a pyrolysis reactor, TT1 is in the range of from 350° C. to 600° C., such as 400° C. to 500° C., and TT2 is in the range of from 450° C. to 800° C., such as 600° C. to 700° C. Optionally, when the injected fluid is a fuel (or a feedstock), the method comprises controlling fluid supply rate through the injector in dependence on the reactor temperature. Optionally, the method comprises continuously varying fuel (or feedstock) supply rate in dependence on the reactor temperature so measured. It will be appreciated that varying the fuel (or feedstock) supply rate may cause a change in bed temperature—for example increasing fuel supply rate into a combustion reactor may lead to an increase in bed temperature. Alternatively, increasing feedstock supply rate into a pyrolysis reactor may lead to a decrease in bed temperature. Thus, in a combustion reactor, when fuel supply rate is varied based on measured bed temperature, such variations in fuel supply rate provides a convenient method for increasing/decreasing bed temperature. For example, fuel may be supplied at a lower rate at temperatures closer to the minimum and maximum threshold temperatures than at temperatures further removed from the threshold temperatures. In a pyrolysis reactor, when feedstock supply rate is varied based on measured bed temperature, such variations in feedstock supply rate may provide a convenient method for controlling the degree of cracking (pyrolysis) in the reactor. Additionally or alternatively, the control system configured to communicate with one or more reactor oxygen analysers, for example when the reactor is a combustion reactor. Optionally, the one or more oxygen analysers include one or more oxygen analysers for measuring oxygen concentration in the fluidised bed zone and/or the freeboard zone (such as one or more intrusive oxygen analysers) and/or one or more oxygen analysers provided on the injector(s). Optionally, the control system is configured to control operation of the fluidising fluid supply system (e.g. wherein the fluidising fluid comprises oxygen, such as air) in dependence on the oxygen concentration measured by said one or more oxygen analysers. Optionally, the control system is configured to control operation of the or each injector in dependence on the oxygen concentration measured by said one or more oxygen analysers. Optionally, when the injected fluid is a fuel, the method comprises supplying fuel with the injector only when the reactor oxygen content falls within pre-determined limits. For example, fuel flow is prevented when the fluidised bed oxygen concentration and/or the freeboard oxygen concentration is below a minimum oxygen concentration threshold O1. Preferably, O1 is at or above the oxygen concentration at which the fuel burns completely. Complete fuel burn is considered to be when substantially all hydrocarbons in the fuel are combusted. It will be understood that the desired oxygen concentration in the reactor may vary according both to composition of the fuel and to the fuel feed rate. Optionally, O1 is in the range of from 1% to 6%, such as 2% to 4%, by volume. Preferably, O1 is in said range when the fuel is selected from LPG and light hydrocarbon gas from a pyrolysis reactor, and/or fuel is injected into the reactor by the injector(s) at a rate of from 10 to 80 kg/h, for example from 40 to 60 kg/h.

Optionally, the fluidised bed reactor is a fluidised bed combustion reactor and the reactor system additionally comprises a fluidised bed pyrolysis reactor. Optionally, the fluidised bed reactor is a fluidised bed pyrolysis reactor and the reactor system additionally comprises a fluidised bed combustion reactor. For example, the pyrolysis and combustion reactors may form a dual fluidised bed reactor apparatus. As used herein, a dual fluidised bed reactor apparatus comprises a fluidised bed pyrolysis reactor configured to contain, in use, a fluidised bed of particulate material, and a fluidised bed combustion reactor also configured to contain, in use, a fluidised bed of particulate material, wherein the apparatus is configured to circulate particulate material between the reactors. Optionally, the reactor system comprises a particulate material transfer system for transporting particulate material between the reactors. Thus, the pyrolysis reactor and the combustion reactor work in tandem, with the particulate material cooled by contact with pyrolysis feedstock in the pyrolysis reactor being heated and/or regenerated in the combustion reactor. Any appropriate mechanism for transferring particulate material between the reactors may be employed. During use, particulate material in the pyrolysis reactor may become contaminated with char and/or cooled by contact with the feed material, especially when the feed material is mixed plastic waste. To avoid a build-up of char in the pyrolysis reactor, and/or to maintain the temperature of the pyrolysis reactor, particulate material is transferred to the combustion reactor where the char, and optionally a fuel (supplied via the injector(s)), is burnt, thereby cleaning and heating the particulate material. Particulate material so withdrawn from the pyrolysis reactor is referred to herein as spent particulate material. Particulate material so returned to the pyrolysis reactor is referred to herein as regenerated particulate material. Optionally, the combustion reactor is configured to operate at a temperature of at least 750° C., for example at least 850° C. Optionally, the combustion reactor is configured to operate at a temperature of from 750° C. to 1050° C., such as from 850° C. to 950° C. Optionally, the pyrolysis reactor is configured to operate at a temperature of at least 400° C., for example at least 450° C. Optionally, the pyrolysis reactor is configured to operate at a temperature of from 400° C. to 600° C., such as from 450° C. to 550° C. A high temperature may be desirable in the combustion reactor to adequately burn char (especially when the feed material is mixed plastic waste) and/or to allow for heat loss as regenerated particulate material is returned to the pyrolysis reactor. Optionally, the reactor system is comprised in a carbonaceous waste recycling apparatus, the apparatus being configured to convert carbonaceous waste to a pyrolysis product. Optionally, the pyrolysis product is a hydrocarbon product, optionally comprising a hydrocarbon gas, a hydrocarbon liquid/oil, a hydrocarbon solid/wax, and/or a mixture thereof. Optionally, the combustion reactor is configured to receive as a fuel at least a portion of the pyrolysis product. Optionally, the pyrolysis reactor is configured to receive as a feedstock at least a portion of the pyrolysis product. Optionally, the carbonaceous waste recycling apparatus is a mixed plastic waste recycle apparatus, for example wherein the apparatus comprises a shredder, a dryer and/or a system of conveyors (e.g. including a screw conveyor and/or blower) for shredding, drying and/or conveying the mixed plastic waste prior to feeding the mixed plastic waste to the pyrolysis reactor with the feed system.

As used herein, the pyrolysis feed material may be any carbonaceous material. Non-limiting examples of carbonaceous feed materials are waste plastics (including, for example, mixed and segregated plastics and rubbers), biomass (including waste biomass, by-product biomass and crop biomass) and oil (including waste oil and plat-derived oil). Optionally, the feed material is a waste stream, for example a waste stream selected from mixed plastic waste, segregated plastic waste, scrap tyres, biomass waste and municipal waste (including for example domestic and/or industrial municipal waste). It will be appreciated that any form of biomass material may be used, including for example food waste, forestry products (such as wood-based chippings or pellets), and crops (such as whole crops or crop by-products such as straw). Optionally, the pyrolysis feed material is a solid, a liquid or a mixture of a solid and a liquid, preferably a solid, at ambient temperature and pressure. It will be understood that the pyrolysis feed material is preferably feed material not previously subjected to pyrolysis in the pyrolysis reactor.

According to a third aspect, the present invention provides a method of supplying fluid into a fluidised bed in a fluidised bed reactor with at least one injector according to the first aspect of the invention, wherein the second section of the at least one injector is located inside the reactor and extends into the fluidised bed, and wherein the method comprises operating the temperature regulator to control fluid temperature in at least the second section of the at least one injector. Optionally the injector is a fuel injector and the fluid is a fuel. Optionally, the reactor is a fluidised bed combustion reactor. Optionally the injector is a feedstock injector and the fluid is a feedstock. Optionally, the reactor is a fluidised bed pyrolysis reactor. Optionally, the reactor and injector are comprised in a reactor system according to the second aspect of the invention. Optionally, there method comprises operating a plurality of such injectors.

Optionally, the method comprises supplying fluid through each injector at a rate of from 0.5 to 100 kg/h, such as from 0.5 to 75 kg/h, such as from 1 to 50 kg/h, for example from 5 to 40 kg/h, for example when the reactor is a combustion reactor and the fluid is a fuel. Optionally, the method comprises supplying fluid (e.g. fuel) through all injectors at a combined rate of from 1 to 200 kg/h, e.g. from 1 to 100 kg/h, such as from 10 to 80 kg/h, for example from 40 to 60 kg/h. Optionally, when the fluid comprises or consists essentially of light and/or medium hydrocarbons, the injector is configured to supply fluid at a rate of from 1 to 50 kg/h.

Additionally or alternatively, the method optionally comprises supplying fluid through each injector at a rate of from 5 to 250 kg/h, such as from 25 to 225 kg/h, such as from 50 to 200 kg/h, for example from 75 to 150 kg/h, for example when the reactor is a pyrolysis reactor and the fluid is a feedstock. Optionally, the method comprises supplying fluid (e.g. feedstock) through all injectors at a combined rate of from 10 to 500 kg/h, e.g. from to 300 kg/h, such as from 50 to 250 kg/h, for example from 100 to 200 kg/h. Optionally, when the fluid comprises or consists essentially of heavy hydrocarbons, the injector is configured to supply fluid at a rate of from 50 to 250 kg/h.

Optionally, the temperature regulator comprises a cooling jacket configured to receive a cooling fluid, and the method comprises supplying a cooling fluid to the cooling jacket. Optionally, the cooling jacket is a flow-return cooling jacket, and the method comprises circulating cooling fluid between a fluid cooler and the cooling jacket. Optionally, the cooling jacket is a flow-through cooling jacket, and the method comprises supplying cooling fluid to the cooling jacket, and optionally co-feeding the cooling fluid into the fluidised bed together with the injected fluid.

Optionally, when the fluid is a fuel, for example when the reactor is a combustion reactor, the injector comprises a combustion sensor for detecting combustion of the fluid in the fluidised bed adjacent the outlet of the injector, and the method comprises permitting continued fuel flow through the injector only when combustion is detected by the combustion sensor. Optionally, the injector comprises a temperature sensor for measuring the temperature of the fluidised bed adjacent the outlet of the injector, and the method comprises controlling fluid supply rate through the injector in dependence on the fluidised bed temperature so measured. Optionally, when the fluid is a fuel, the method comprises supplying fuel into the fluidised bed with the injector only when the temperature so measured falls within a predetermined range. For example, fuel flow is prevented when the fluidised bed temperature is below a minimum temperature threshold TT1 and/or when the fluidised bed temperature is above a maximum temperature threshold TT2. Preferably, TT1 is at or above the auto ignition temperature of the fuel, and/or TT2 is at or below the maximum design temperature of the fluidised bed reactor. Optionally, TT1 is in the range of from 450° C. to 650° C., such as 500° C. to 600° C., and TT2 is in the range of from 800° C. to 1100° C., such as 815° C. to 1050° C. Such a control system may assist in avoiding a build-up of unburnt fuel in the reactor system and/or prevent overheating of the reactor system. Optionally, the method comprises continuously varying fuel supply rate in dependence on the fluidised bed temperature so measured. For example, fuel may be supplied at a lower rate at temperatures closer to the minimum and maximum threshold temperatures than at temperatures further removed from the threshold temperatures.

Optionally, when the fluid is fuel, for example when the reactor is a combustion reactor, the injector comprises an ignition electrode, and the method comprises operating the ignition electrode to ignite fuel in the fluidised bed adjacent the outlet of the injector. Optionally, the method comprises operating the ignition electrode only during start-up of the reactor, for example when the fluidised bed temperature is below the auto ignition temperature of the fuel.

Optionally, the method comprises operating the injector in a fuel (or feedstock) supply mode and subsequently in a fuel (or feedstock) shut-off mode. Optionally, in the fuel (or feedstock) supply mode, the method comprises supplying fuel (or feedstock) into the fluidised bed with the injector, and in the fuel (or feedstock) shut-off mode, the method comprises flushing at least the second portion of the internal flow path (optionally the entire internal flow path) with an inert gas, such as nitrogen. The shut-down mode may help to avoid decomposition of fuel (or feedstock) in the injector when not in use and/or reduce the risk of a fuel (or feedstock) leak when the reactor system undergoes maintenance.

According to a fourth aspect, the present invention provides a method of operating a reactor system according to the second aspect of the invention, the method comprising fluidising particulate material in the fluidised bed zone to form a fluidised bed, operating the at least one injector to supply fluid into the fluidised bed, and operating the temperature regulator to control fluid temperature in at least the second section of the at least one injector. Optionally, the method comprises operating the injector according to the method of the third aspect of the invention. Optionally, the reactor system comprises a plurality of such injectors, and the method optionally comprises operating each injector independently of the other injector(s).

Optionally, the reactor system comprises at least one temperature sensor for measuring temperature of the fluidised bed, and the method comprises controlling the or each injector in dependence on the fluidised bed temperature. Optionally, for example when the reactor is a combustion reactor, the reactor comprises an auxiliary heater for providing auxiliary heat to the fluidised bed, and the method comprises controlling the auxiliary heater in dependence on the fluidised bed temperature. Optionally, the reactor system comprises a fluidising fluid heater for heating fluidising fluid prior to its supply into the reactor via a distributor, and the method comprises controlling the fluidising fluid heater in dependence on the fluidised bed temperature. Optionally, the method comprises operating the reactor system in a start-up mode, wherein the method comprises at least one of: (i) operating a fluidising fluid heater, or (ii) operating an auxiliary heater, to heat the particulate material of the fluidised bed from a temperature below a pre-set minimum injection temperature (e.g. from ambient temperature) to a temperature above the pre-set minimum injection temperature. Additionally or alternatively, the method comprises operating the reactor in an initiation mode, wherein the method comprises injecting fuel into the fluidised bed and operating an ignition electrode on the injector to ignite fuel in the fluidised bed, thereby heating the fluidised bed from a temperature below a pre-set minimum operating temperature to a temperature above the pre-set minimum operating temperature.

Optionally, the fluid is a fuel and the method comprises supplying fuel into the reactor with the injector to maintain the fluidised bed at a pre-set operating temperature, for example wherein the pre-set operating temperature is a temperature of from 650° C. to 1050° C., such as 750° C. to 950° C. Optionally, the method comprises adjusting reactor temperature by varying fuel supply rate. For example, the method comprises i) increasing fuel supply rate to increase reactor temperature, and/or ii) decreasing fuel supply rate to decrease reactor temperature. Optionally, the method comprises operating the reactor at a pressure of from 0.1 to 2 barg, such as from 0.2 to 1 barg, for example 0.3 to 0.5 barg. Optionally, the method comprises operating the injector to inject the fluid at a pressure above the reactor pressure.

Optionally, the fluidised bed reactor is a fluidised bed combustion reactor and the reactor system additionally comprises a fluidised bed pyrolysis reactor. Optionally, the fluidised bed reactor is a fluidised bed pyrolysis reactor and the reactor system additionally comprises a fluidised bed combustion reactor. For example, the pyrolysis and combustion reactors may form a dual fluidised bed reactor apparatus, wherein the method comprises circulating particulate material between the pyrolysis and combustion reactors. Optionally, the method comprises operating the pyrolysis reactor to pyrolyse a feed material (e.g. carbonaceous waste, such as mixed plastic waste) to form a pyrolysis product, and supplying at least a portion of the pyrolysis product to the combustion reactor as a fuel. Additionally or alternatively, the method comprises supplying at least a portion of the pyrolysis product to the pyrolysis reactor as a feedstock.

According to a fifth aspect, the present invention provides a fuel supply system for a fluidised bed combustion reactor, the fuel supply system comprising the injector of the first aspect of the invention and a fluid supply manifold for controlling supply of fluid to the injector. Optionally, the fluid supply manifold is configured to control supply of a first fluid and a second fluid to the injector, for example wherein the first fluid is an inert gas (such as nitrogen) and the second fluid is a fuel. Optionally, the fluid supply manifold is operable to purge the injector of fuel with inert gas, for example during shut down of the reactor and/or when fuel is no longer required in the fluidised bed. Optionally, the fuel supply system comprises a plurality of injectors, and the fluid supply manifold is configured to supply fluid independently to each injector. Optionally, the fluid supply manifold is configured to receive fuel from a pyrolysis reactor, for example wherein the fuel is a pyrolysis product produced by the pyrolysis reactor. Optionally, the combustion reactor is comprised in a dual fluidised bed reactor system comprising a fluidised bed pyrolysis reactor and the combustion reactor, the pyrolysis reactor being configured to pyrolyse a feedstock (such as carbonaceous waste, for example mixed plastic waste) to produce a pyrolysis product, optionally wherein the pyrolysis product is fractionated to produce a light hydrocarbon fraction (such as a $C_3$-$C_6$ hydrocarbon fraction) and at least one heavier hydrocarbon fraction. Optionally, the fuel supply system is configured to supply the light hydrocarbon fraction to the combustion reactor for use as a fuel. Additionally or alternatively, the fluid supply manifold is configured to receive a light hydrocarbon fuel (e.g. LPG) from another source, such as commercial hydrocarbon fuel. Optionally, the fuel supply system comprises one or more tanks for storing the fuel. Optionally, the fluid supply manifold is configured to control supply of a first fluid, a second fluid and a third fluid to the injector, wherein the first fluid is an inert gas (such as nitrogen), the second fluid is a fuel stored in a tank (e.g. a propane-based fuel, such as commercial LPG), and the third fluid is a pyrolysis product produced by the pyrolysis reactor. Providing a secondary fuel supply (such as LPG) may be important during start-up of the reactor (when the pyrolysis product may not be available) or in the event of fluctuations of pyrolysis product quality, for example.

According to a sixth aspect, the present invention provides a feedstock supply system for a fluidised bed pyrolysis reactor, the feedstock supply system comprising the injector of the first aspect of the invention and a fluid supply manifold for controlling supply of fluid to the injector. Optionally, the fluid supply manifold is configured to control supply of a first fluid and a second fluid to the injector, for example wherein the first fluid is an inert gas (such as nitrogen) and the second fluid is a feedstock. Optionally, the fluid supply manifold is operable to purge the injector of feedstock with inert gas, for example during shut down of the reactor and/or when feedstock is no longer required in the fluidised bed. Optionally, the feedstock supply system comprises a plurality of injectors, and the fluid supply manifold is configured to supply fluid independently to each injector. Optionally, the fluid supply manifold is configured to receive feedstock from the pyrolysis reactor, for example wherein the feedstock is a pyrolysis product produced by the pyrolysis reactor. Optionally, the pyrolysis reactor is comprised in a dual fluidised bed reactor system comprising a fluidised bed combustion reactor and the pyrolysis reactor, the combustion reactor being configured to combust a pyrolysis product, optionally wherein the pyrolysis product is fractionated to produce a light hydrocarbon fraction (such as a $C_3$-$C_6$ hydrocarbon fraction) and at least one heavier hydrocarbon fraction. Optionally, the light hydrocarbon fraction is supplied to the combustion reactor for use as a fuel. Optionally, the feedstock supply system comprises one or more tanks for storing the feedstock. Optionally, the fluid supply manifold is configured to control supply of a first fluid, a second fluid and a third fluid to the injector, wherein the first fluid is an inert gas (such as nitrogen), the second fluid is a feedstock stored in a tank (e.g. a waste medium hydrocarbon material, such as waste oil), and the third fluid is a pyrolysis product produced by the pyrolysis reactor.

It will of course be appreciated that features described in relation to one aspect of the present invention may be incorporated into other aspects of the present invention. For example, the method of the invention may incorporate any of the features described with reference to the apparatus of the invention and vice versa.

It will be appreciated that the injector of the present invention may be utilised to inject a fluid other than fuel into a fluidised bed reactor, and/or the fluidised bed reactor may not be a combustion reactor. For example, the fluid may be a feedstock and/or the reactor may be a pyrolysis or fluid catalytic cracking reactor.

DESCRIPTION OF THE DRAWINGS

Embodiments of the present invention will now be described by way of example only with reference to the accompanying schematic drawings of which:

FIG. 10 shows a top plan view of a fluid injector according to another embodiment of the invention;

FIG. 11 shows a cross-sectional side view in direction A-A of the fluid injector of FIG. 10;

DETAILED DESCRIPTION

Figures 1, 2:
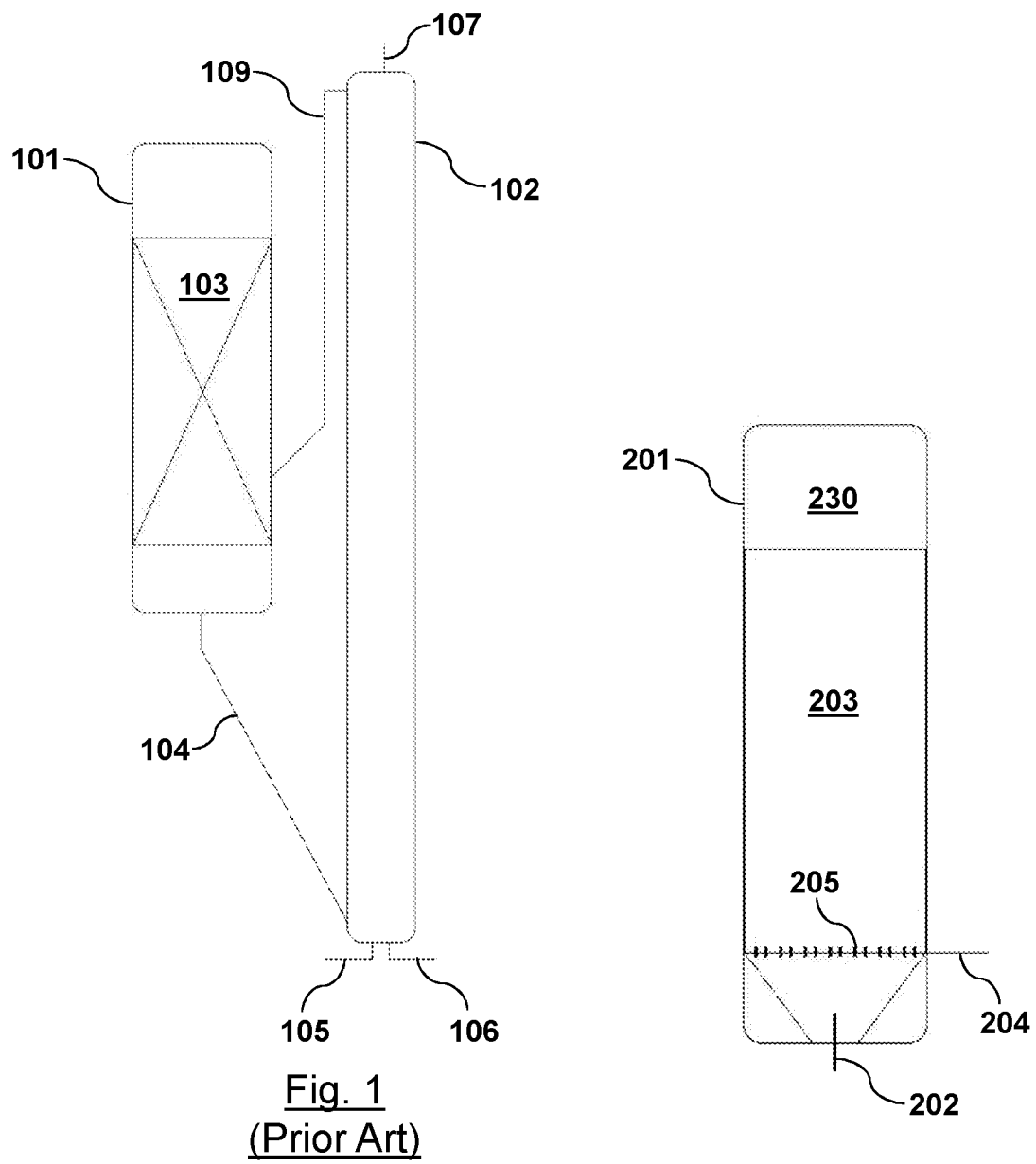
FIG. 1 shows a schematic view of a circulating fluidised bed reactor system known in the prior art.
FIG. 2 shows a schematic view of a bubbling fluidised bed combustion reactor known in the prior art.
Figure 3:
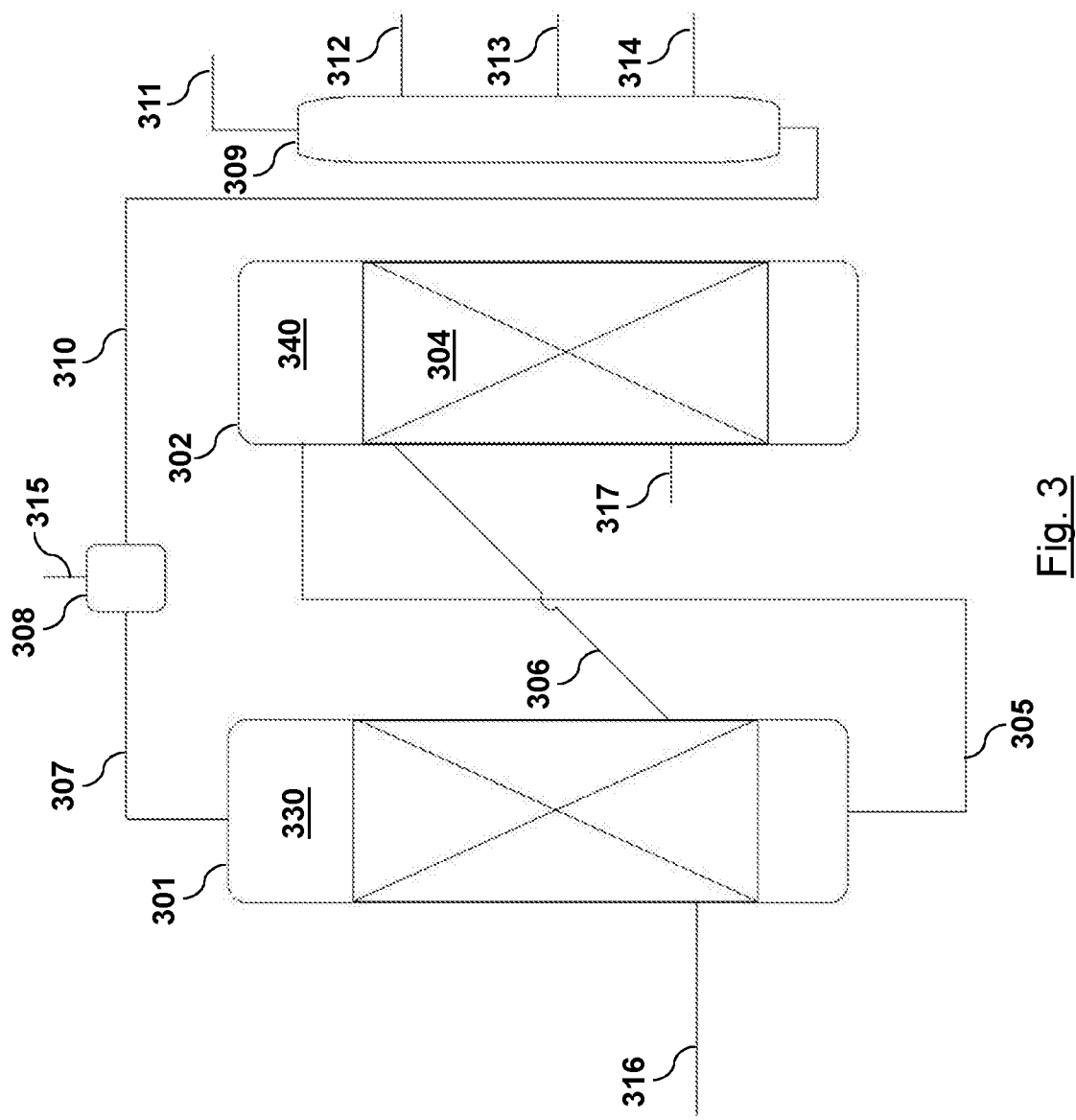
FIG. 3 shows a schematic view of a dual fluidised bed pyrolysis apparatus according to an embodiment of the invention.

In FIG. 3, a dual fluidised bed pyrolysis apparatus is shown comprising a fluidised bed pyrolysis reactor 301, and a fluidised bed combustion reactor 302. The reactors 301, 302 each comprise a fluidised bed zone 303, 304 and a freeboard zone 330, 340. During use, each fluidised bed zone 303, 304 contains a fluidised bed of particulate material, the particulate material being fluidised by injection of fluidising gas into the pyrolysis reactor 301 and the combustion reactor 302 via fluidising gas lines and distributors (not shown in FIG. 3). Any suitable fluidising gas distributor may be used with the reactor assembly. During use, spent particulate material is collected from the bottom of the pyrolysis reactor 301 and fed to combustion reactor 302 via withdrawal line 305. Optionally, the spent particulate material is conveyed upwards to an upper portion of the combustion reactor 302 as it travels along withdrawal line 305. The withdrawal line 305 may include any suitable apparatus for elevating the particulate material, such as a mechanical or non-mechanical apparatus (e.g. a screw conveyer or a pneumatic conveyer). Regenerated particulate material is returned from combustion reactor 302 to pyrolysis reactor 301 via return line 306. Return line 306 may be configured to allow regenerated particulate material to return to pyrolysis reactor 301 substantially under gravity, and/or may comprise any suitable conveying apparatus (such as a screw conveyer or a pneumatic conveyer). During use, feed material is pyrolysed in the pyrolysis reactor 301 to form a pyrolysis product vapour. The pyrolysis product vapour is withdrawn from the top of the pyrolysis reactor 301 via line 307, and then passed through a cleaning device 308 (which may be a hot gas filter) which separates unwanted contaminants from the pyrolysis product vapour via line 315. The cleaned pyrolysis product vapour is then passed to a condenser assembly 309 via line 310. Condenser assembly 309 separates the pyrolysis product vapour into a plurality of fractions, each separately collected via lines 311, 312, 313 and 314. The use of a condenser assembly is optional, and it will be appreciated that the pyrolysis product may be separated into any number of fractions, depending on the requirements of the operator. Feed material, which may be carbonaceous waste, for example mixed plastic waste, is supplied into the pyrolysis reactor 301 via a feed system 316. Fuel is supplied into the combustion reactor 302 via a fluid injector 317. It will be appreciated that feed system 316 may itself comprise a fluid injector.

Figure 4:
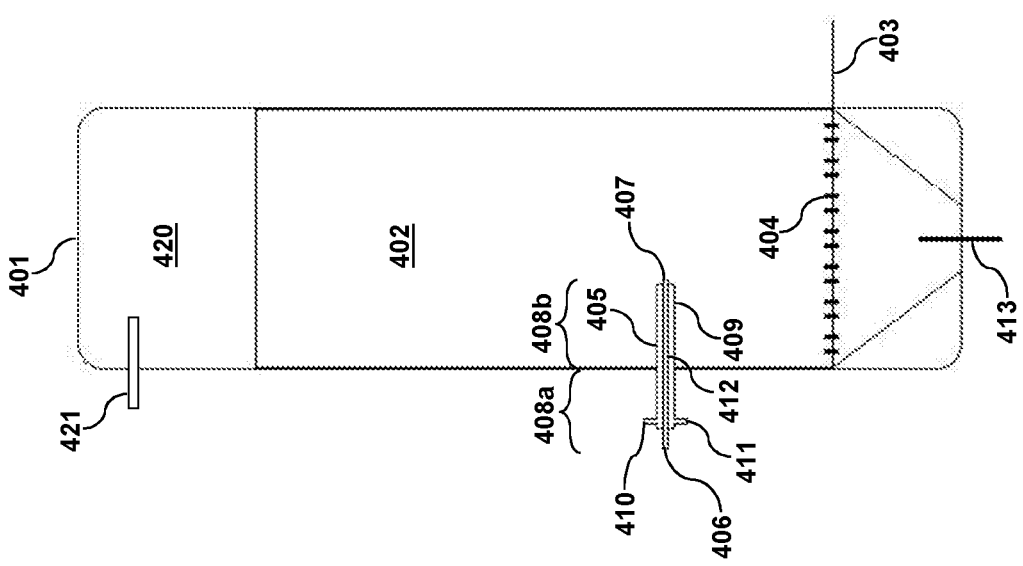
FIG. 4 shows a schematic view of a fluidised bed combustion reactor comprising a fluid injector with a closed loop cooling jacket, according to another embodiment of the invention.

FIG. 4 shows a fluidised bed combustion reactor 401 suitable for use in the dual fluidised bed pyrolysis apparatus of FIG. 3, the reactor 401 comprising a fluidised bed zone 402 and a freeboard zone 420. An intrusive sensor array 421 comprising a temperature sensor and a pressure sensor is provided for measuring temperature and pressure in the freeboard zone 420. The reactor 401 is provided with an outlet for removal of combustion gasses (not shown in FIG. 4). Connected to the outlet is an oxygen analyser for detecting oxygen level in the combustion gasses. During use, zone 402 contains a fluidised bed of particulate material fluidised by injection of fluidising gas into the combustion reactor 401 via fluidising gas line 403 and fluidising gas distributors 404. Any suitable fluidising gas distributor may be used with the reactor assembly. Fluid, for example fuel, is supplied into the fluidised bed combustion reactor 401 via a fluid injector 405. The fluid injector 405 comprises an internal flow passage 412 extending from a fluid inlet 406 to a fluid outlet 407, the fluid injector having a first section 408a comprising a portion of the internal flow passage 412 and the fluid inlet 406, and a second section 408b comprising another portion of the internal flow passage 412 and the fluid outlet 407. The injector 405 comprises a nozzle at the outlet 407 (not shown in FIG. 4). The first section 408a of the fluid injector 405 is located outside the reactor 401, and the second section 408b protrudes into the fluidised bed zone 402. In use, the fluid outlet 407 is positioned in body of the fluidised bed in zone 402. The internal flow passage 412 of the fluid injector 405 is surrounded by a closed loop cooling jacket 409 along most of its length. The cooling jacket 409 has a double pipe structure, with the internal flow passage 412 defined by a relatively small diameter inner pipe concentrically arranged inside a larger diameter outer pipe. Cooling fluid flows through the space between the pipes, with baffles (not shown in FIG. 4) positioned to direct cooling fluid along the length of the cooling jacket 409. The cooling jacket 409 has an inlet 410 and an outlet 411 positioned on the first section 408a of the injector 405, and the cooling jacket 409 extends into the reactor 401 towards the outlet of the injector 405. The cooling jacket 409 extends along substantially the whole length of the second section 408a of the injector 405. The cooling fluid inlet 410 and outlet 411 are connected to a fluid cooling system (not shown) comprising a fluid cooler (not shown), so that in use a cooling fluid is circulated between the cooling jacket 409 and the fluid cooler by a pump (also not shown). An under-bed burner 413 is provided as an auxiliary heater to burn fuel in a space under the fluidised bed zone 402, thereby heating particulate material in the fluidised bed. Typically, the under-bed burner 413 is used during start-up of the reactor. It will be appreciated that, while the features of fluid injector 405 have been defined by reference to fluidised bed combustion reactor 401, such a fluid injector may be equally suited to use with other types of reactors, for example a pyrolysis reactor.

Figure 5:
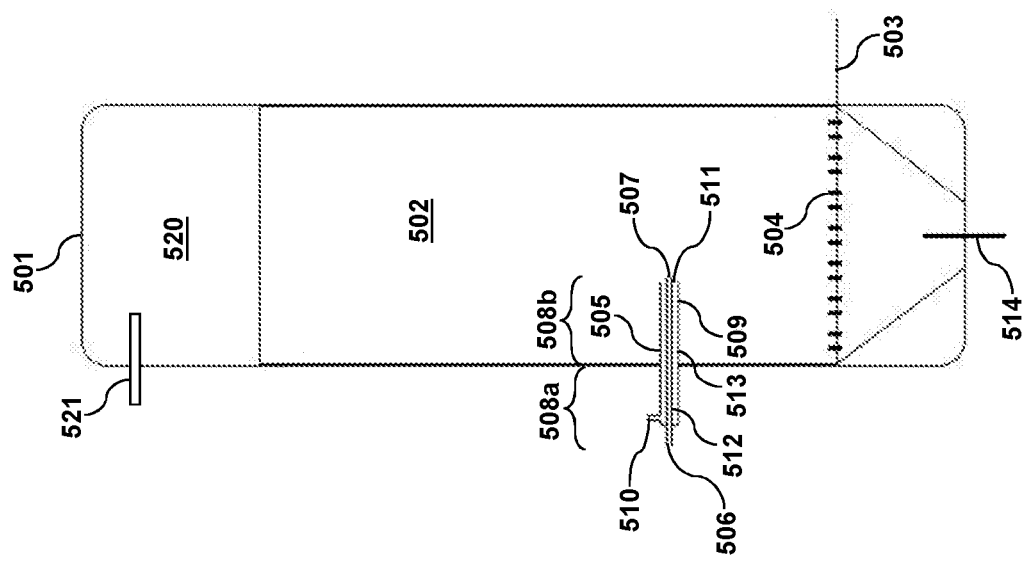
FIG. 5 shows a schematic view of a fluidised bed combustion reactor comprising a fluid injector with an open ended cooling jacket, according to another embodiment of the invention.

In FIG. 5, a fluidised bed combustion reactor 501 is shown comprising a fluidised bed zone 502, freeboard zone 520, fluidising gas line 503 and fluidising gas distributor 504. An intrusive sensor array 521 comprising a temperature sensor and a pressure is provided for measuring temperature and pressure in the freeboard zone 520. The reactor 501 is provided with an outlet for removal of combustion gasses (not shown in FIG. 5). Connected to the outlet is an oxygen analyser for detecting oxygen level in the combustion gasses. It will be appreciated that fluidised bed combustion reactor 501 is configured to operate in like manner to the fluidised bed combustion reactor 401 of FIG. 4, as described above. Fluid (e.g. fuel) is supplied into the combustion reactor 501 via a fluid injector 505, which comprises an internal flow passage 512 extending from a fluid inlet 506 to a fluid outlet 507, the fluid injector 505 having a first section 508a comprising a portion of the internal flow passage 512 and the fluid inlet 506, and a second section 508b comprising another portion of the internal flow passage 512 and the fluid outlet 507. It will be appreciated that the fluid injector 505 is configured to operate in like manner to the fluid injector 405 of FIG. 4, as described above. The internal flow passage 512 of fluid injector 505 is surrounded by an open ended cooling jacket 509 along the majority of its length. The open ended cooling jacket 509 is in the form of a second internal flow passage 513 disposed around the first internal flow passage 512 of the fluid injector 505. The first internal flow passage 512 is defined by a small diameter pipe, and the second internal flow passage 513 is defined by a large diameter pipe, the small and large diameter pipes being concentrically arranged. The second internal flow passage 513 is suitable for supplying a second fluid into the fluidised bed reactor 502, and extends from a second inlet 510 in the first section 508a of the fluid injector 505 to a second outlet 511 in the second section 508b of the injector. The second outlet 511 comprises a plurality of nozzles arranged around the nozzle of the outlet 507 (no nozzles are shown in FIG. 5). In use, the fluid injector 505 co-feeds a first fluid delivered through the first internal flow passage 512 and a second fluid delivered through the second internal flow passage 513. The second fluid may be an inert gas, an oxygen containing gas (such as air) or water. During use, the second fluid in the second flow passage 513 insulates the first fluid in the first flow passage 512 from the heat of the fluidised bed zone 502. An auxiliary heater 514 is located below the fluidised bed zone 502. It will be appreciated that, while the features of fluid injector 505 have been defined by reference to fluidised bed combustion reactor 501, such a fluid injector may be equally suited to use with other types of reactors, for example a pyrolysis reactor. It will be appreciated that when the reactor is a pyrolysis reactor, the second fluid may comprise no, or only trace amounts, of oxygen.

Figure 6:
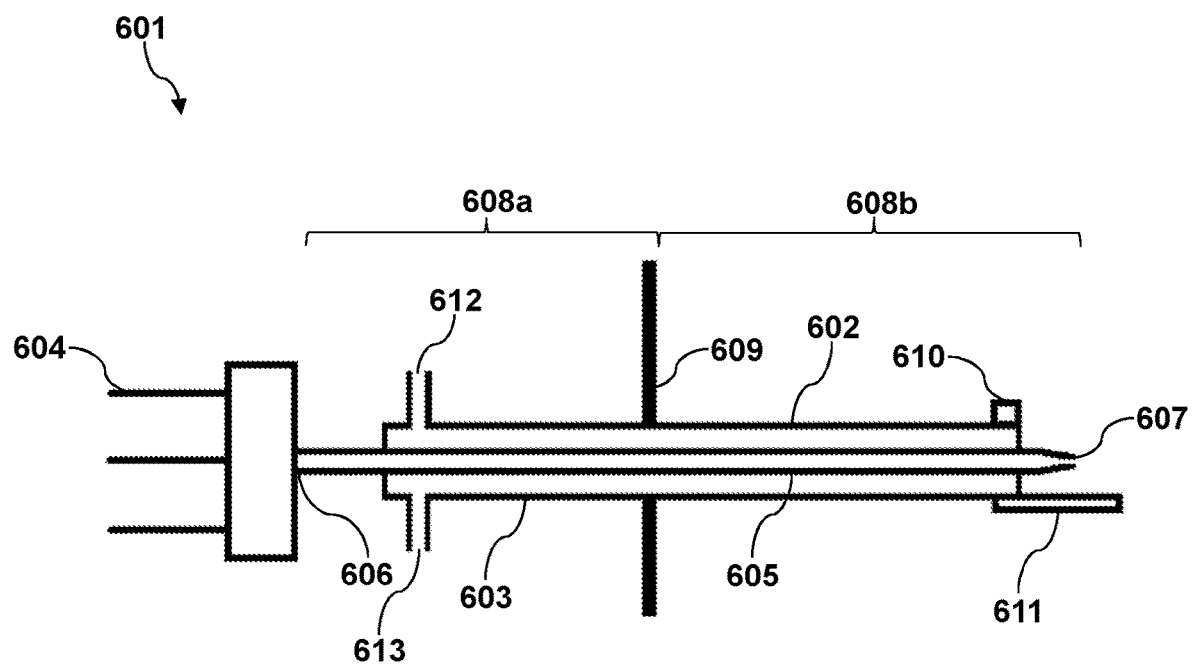
FIG. 6 shows a schematic view of a fuel supply system comprising a fluid supply manifold and a fluid injector with a closed loop cooling jacket, according to another embodiment of the invention.

FIG. 6 shows a fuel supply system 601 for supplying fuel to a fluidised bed reactor (only the wall 609 of the reactor is shown in FIG. 6), the system comprising a fuel injector 602 with a closed loop cooling jacket 603 and a fluid supply manifold 604. The fluid injector 602 comprises an internal flow passage 605 extending from a fluid inlet 606 to a fluid outlet 607, the fluid injector 602 having a first section 608a and a second section 608b, the second section 608b extending into a fluidised bed from the reactor wall 609. The fluid injector 602 is configured to operate in like manner to the fluid injector 405 of FIG. 4, as described above. The fluid injector 602 comprises a combustion sensor 610 positioned on the second section 608b, proximate the outlet 607. The combustion sensor includes a thermocouple configured to detect combustion of fuel proximate the outlet 607. The fluid injector 602 additionally comprises an ignition electrode 611 positioned on the second section 608b, proximate the outlet 607. The ignition electrode 611 is configured to ignite fuel exiting the outlet 607, and is typically used when the fluidised bed temperature is below the auto ignition temperature of the fuel. The internal flow passage 605 of the fluid injector 602 is surrounded by a closed loop cooling jacket 603 for most of its length, the jacket 603 comprising a cooling fluid inlet 612 and a cooling fluid outlet 613, and acting to control fluid temperature in at least the second section 608b of the fluid injector 602. The fluid supply system further comprises a fluid supply manifold 604 for controlling supply of fluid to the fluid injector 602. The fluid supply manifold 604 is connected to three fluid supplies—an inert gas, LPG, and a light hydrocarbon pyrolysis product.

The inert gas is typically used to flush the injector prior to reactor shut down or when fuel supply is shut off. Light hydrocarbon pyrolysis product, typically produced in a pyrolysis reactor working in tandem with the combustion reactor is used during normal operation, while LPG is used when the light hydrocarbon pyrolysis product is not available (e.g. during start-up). Alternatively, the light hydrocarbon pyrolysis product supply may be omitted. It will be appreciated that any suitable fuel may be used, such as heavier hydrocarbon fuels. The fluid supply manifold 604 is operable to switch between and/or combine fluid flows. It will be appreciated that supply system 601 could be used to supply different fluids, for example to supply fuel, or to supply feedstock. Thus, it will be appreciated that supply system 601 could be used to supply fluid to different types of reactor. For example, the supply system could be used to supply fuel to a fluidised bed combustion reactor, such as fluidised bed combustion reactor 401 of FIG. 4. Additionally or alternatively, the supply system could be used to supply feedstock to a fluidised bed pyrolysis reactor. It will be appreciated that with certain types of reactor, for example with a pyrolysis reactor, the combustion sensor and/or the ignition electrode need not be present.

Figure 7:
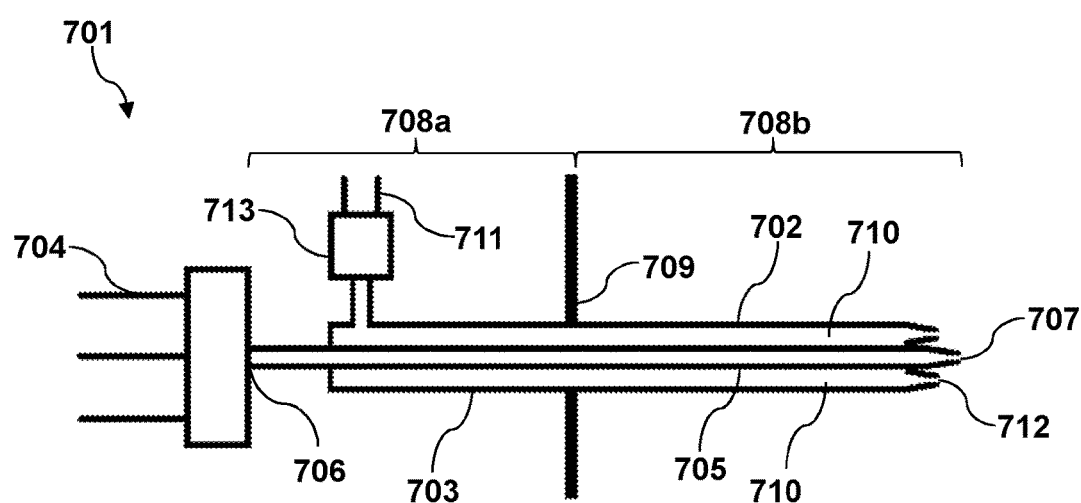
FIG. 7 shows a schematic view of a fluid supply system comprising a fluid supply manifold and a fluid injector with an open ended cooling jacket, according to another embodiment of the invention.

FIG. 7 shows a fluid supply system 701 for supplying fluid to a fluidised bed combustion reactor (only the wall 709 of the reactor is shown in FIG. 7), the system comprising a fluid injector 702 with an open ended cooling jacket 703 and a fluid supply manifold 704. The fluid injector 702 comprises a first internal flow passage 705 for supplying fuel into the reactor and extending from a fuel inlet 706 to a fuel outlet 707, the fluid injector 702 having a first section 708a and a second section 708b, the second section 708b extending into a fluidised bed from the reactor wall 709. The fluid injector 702 is configured to operate in like manner to the fluid injector 505 of FIG. 5, as described above. The first internal flow passage 705 is surrounded by an open ended cooling jacket 703 along most of its length, the jacket 703 including a second internal flow passage 710 disposed around the first internal flow passage 705 of the fluid injector 702. The second internal flow passage 710 is defined between a smaller diameter pipe concentrically arranged within a larger diameter pipe, the smaller diameter pipe defining the first internal flow passage 705. The second internal flow passage 710 is for supplying another fluid (which may be an oxygen-containing gas, water or an inert gas) and comprises a second inlet 711 in the first section 708a of the fluid injector 702, and a second outlet 712 in the second section 708b of the injector. The fluid supply system of FIG. 7 further comprises a first fluid supply manifold 704 for controlling supply of fluid into the first internal flow passage 705 of the injector 702. The first fluid supply manifold 704 is substantially identical to the fluid supply manifold 604 of FIG. 6, as described above. A second fluid supply manifold 713 controls fluid supply to the second internal flow passage via the second inlet 711. The second fluid supply manifold 713 is connected to two fluid supplies—inert gas and an oxygen-containing gas. The inert gas is used to flush the second internal flow passage and/or when oxygen-containing gas is not required. Additionally or alternatively, the manifold may be connected to a water supply. It will be appreciated that supply system 701 could be used to supply different fluids, for example to supply feedstock. Thus, it will be appreciated that supply system 701 could be used to supply fluid to different types of reactor. For example, the supply system could be used to supply feedstock to a fluidised bed pyrolysis reactor. It will be appreciated that with certain types of reactor, for example with a pyrolysis reactor, the fluid supplied via the second internal flow passage 710 may contain no, or only trace amounts of, oxygen.

Figure 8:
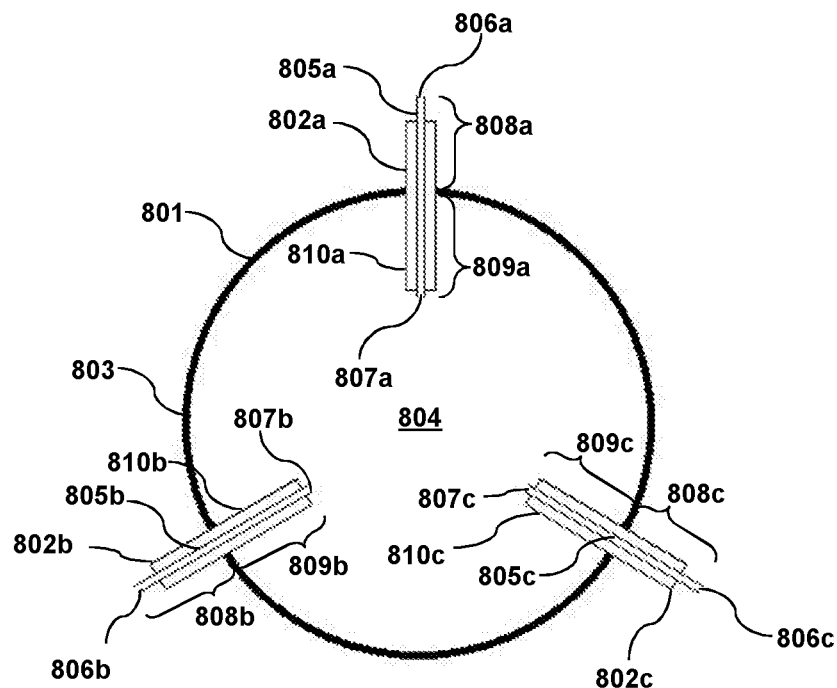
FIG. 8 shows a schematic plan view of a fluidised bed combustion reactor comprising three fluid injectors, according to another embodiment of the invention.

FIG. 8 shows a plan cross-sectional view of a fluidised bed combustion reactor 801 and three fuel injectors 802a, 802b, 802c. The openings in the reactor shell through which the fluid injectors 802a, 802b, 802c pass are distributed evenly around the circumference of the reactor shell 803 in a plane perpendicular to the net direction of fluid flow through the reactor, the injectors 802a, 802b, 802c being aligned horizontally in said plane. Each injector 802a, 802b, 802c extends towards the central longitudinal axis of the fluidised bed zone 804, which is the axis extending from the bottom of the fluidised bed zone 804 to the top, equidistant the opposing sides. Each injector 802a, 802b, 802c supplies fuel into the fluidised bed reactor 801; each comprises an internal flow passage 805a, 805b, 805c extending from an inlet 806a, 806b, 806c positioned outside the fluidised bed reactor to an outlet 807a, 807b, 807c positioned inside the fluidised bed zone 804; each has a first section 808a, 808b, 808c outside the reactor 801 and a second section 809a, 809b, 809c inside the reactor 801; each comprises a cooling jacket 810a, 810b, 810c, surrounding the internal flow passage 805a, 805b, 805c, along substantially its entire length. It will be appreciated that different types of reactors could be suitable for use in the reactor system shown in FIG. 8. For example, fluidised bed reactor 801 could be a pyrolysis reactor. Injectors 802a, 802b, 802c could be feedstock injectors, to supply feedstock to the pyrolysis reactor.

Figure 9:
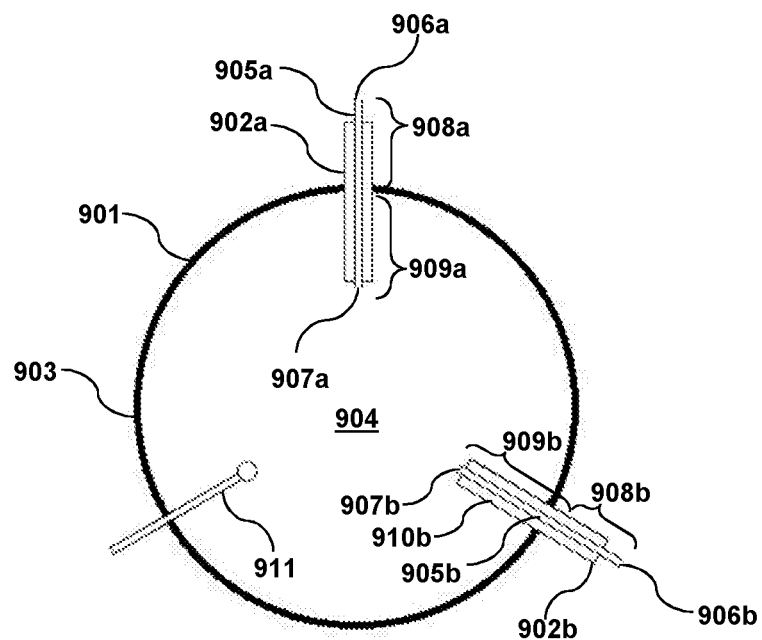
FIG. 9 shows a schematic plan view of a fluidised bed combustion reactor comprising two fluid injectors and one intrusive temperature sensor, according to another embodiment of the invention.

FIG. 9 shows a plan cross-sectional view of a reactor system comprising a fluidised bed reactor 901, two fluid injectors 902a, 902b and an intrusive temperature sensor 911. The openings in the reactor shell 903 through which the temperature sensor and fluid injectors pass are distributed evenly around the circumference of the reactor shell in a plane perpendicular to the net direction of fluid flow through the reactor 901, the injectors 902a, 902b and intrusive temperature sensor being aligned horizontally in said plane. The injectors 902a, 902b and temperature sensor 911 extend towards the central longitudinal axis of the fluidised bed zone 904, which is the axis extending from the bottom of the fluidised bed to the top, equidistant the opposing sides. Each injector 902a, 902b supplies fluid into the fluidised bed reactor 901; each comprises an internal flow passage 905a, 905b extending from an inlet 906a, 906b positioned outside the fluidised bed reactor 901 to an outlet 907a, 907b positioned in the fluidised bed zone 904 inside the fluidised bed reactor 901; each has a first section 908a outside the reactor 901 and a second section 909a inside the reactor; each comprises a cooling jacket 910a, 910b, surrounding the internal flow passage 905a, 905b, along substantially its entire length. The intrusive temperature sensor 911 extends through the reactor wall and is configured to intrude into the fluidised bed zone 904 in order to measure the fluidised bed temperature when the reactor 901 is in use. The intrusive temperature sensor 911 communicates with a reactor system that is configured to control operation of the fluid supply that provides fluid (including fuel) to the injectors 902a, 902b. It will be appreciated that different types of reactors could be suitable for use in the reactor system shown in FIG. 9. For example, fluidised bed reactor 901 could be a combustion reactor. Injectors 902a, 902b could be fuel injectors, to supply fuel to the combustion reactor. In another example, fluidised bed reactor 901 could be a pyrolysis reactor. Injectors 902a, 902b could be feedstock injectors, to supply feedstock to the pyrolysis reactor.

FIG. 10 shows a top view of a fluid injector 1001 connected to a reactor wall 1020, the injector 1001 comprising an internal flow passage (not shown) extending from a fluid inlet 1002 to a fluid outlet 1003, the fluid injector 1001 having a first section 1004a positioned outside the reactor and comprising the fluid inlet 1002, and a second section 1004b positioned inside the reactor and comprising the fluid outlet 1003. The fluid injector 1001 is configured to operate in like manner to the fluid injector 405 of FIG. 4, as described above. The fluid injector 1001 comprises a closed loop cooling jacket 1005 having a cooling fluid inlet 1008 and a cooling fluid outlet 1009 located on the first section 1004a of the injector. The cooling jacket 1005 extends through the reactor wall 1020 and along most of the second section 1004b of the injector. The fluid outlet 1003 is defined by a nozzle. The fluid injector 1001 comprises a connection portion 1007 for connecting and attaching the injector 1001 to sleeve 1006 that passes through an opening in the reactor wall 1020. The connection portion 1007 is positioned on the first section 1004a of the injector 1001. The connection portion 1007 is in the form of a flange. It will be appreciated that fluid injector 1001 could be suitable for use with different types of reactors. For example, fluid injector 1001 could be a fuel injector, suitable for use with a combustion reactor. In another example, fluid injector 1001 could be a feedstock injector, suitable for a pyrolysis reactor. It will be appreciated that the design of the nozzle defining fluid outlet 1003 may vary according to the nature of fluid being injected. For example, larger nozzle diameters may be desirable for heavier and/or more viscous fluids.

FIG. 11 shows a side cross-sectional view in direction A-A of the fluid injector 1001 of FIG. 10. The internal flow passage 1121 is shown in FIG. 11 extending from the fluid inlet 1002 to the fluid outlet 1003. A layer of glasswool insulation 1122 is shown positioned in the space between the sleeve and the injector 1001. The cooling jacket 1005 is made up of three concentrically arranged pipes of varying diameter, the innermost pipe 1110 defining an internal flow passage 1130, the gap between the innermost pipe and the middle pipe 1112 defining an outward coolant passage 1131 starting at the cooling fluid inlet 1008, and the gap between the middle pipe and the outermost pipe 1111 defining a return coolant passage 1132 ending at the cooling fluid outlet 1009. Thus, the middle pipe 1112 acts as a baffle. In use, a cooling fluid is circulated between the cooling jacket 1105 and a fluid cooler by a pump (not shown). It will be appreciated that fluid injector 1001 could be suitable for use with different types of reactors. For example, fluid injector 1001 could be a fuel injector, suitable for use with a combustion reactor. In another example, fluid injector 1001 could be a feedstock injector, suitable for a pyrolysis reactor. It will be appreciated that the design of the nozzle defining fluid outlet 1003 may vary according to the nature of fluid being injected. For example, larger nozzle diameters may be desirable for heavier and/or more viscous fluids.

Figure 12:
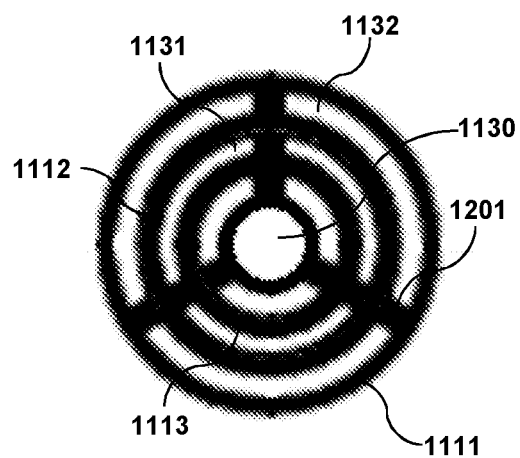
FIG. 12 shows a schematic cross-sectional end view in direction B-B of the fluid injector of FIG. 10.

FIG. 12 shows an end cross-sectional view in direction B-B of the fluid injector 1001 of FIG. 10. The outermost pipe 1111, middle pipe 1112 and inner pipe 1113 are shown in FIG. 12, along with the return coolant passage 1132, the outward coolant passage 1131, and the internal flow passage 1130. The pipes 1111, 1112 and 1113 are spaced apart by supports 1201. It will be appreciated that fluid injector 1001 could be suitable for use with different types of reactors. For example, fluid injector 1001 could be a fuel injector, suitable for use with a combustion reactor. In another example, fluid injector 1001 could be a feedstock injector, suitable for a pyrolysis reactor.

Figure 13:
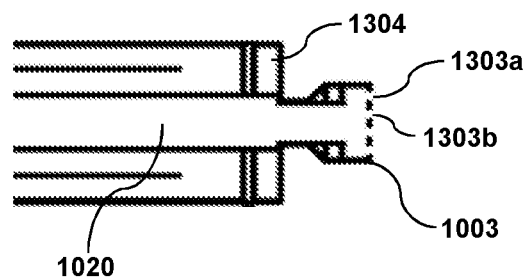
FIG. 13 shows an enlarged view of section C of the cross-sectional side view of the fluid injector of FIG. 11.

FIG. 13 shows an enlarged view of section C of FIG. 11, comprising the second end of the fluid injector 1001. The internal structure of the nozzle 1003 is shown, including a plurality of openings 1303a, 1303b which direct fluid exiting the nozzle in a direction different to the net flow direction of fluidising fluid through the fluidised bed. This arrangement helps to inhibit ingress of fluidised bed particulate material into the internal flow passage 1020 when the injector is not operating. The openings 1303a, 1303b are also sized to inhibit ingress of the particulate material. In addition to being sized to inhibit ingress of the particulate material, the openings are sized to provide a pressure drop that is around 20% of the pressure drop across the bed when the injector is operated to deliver fuel at a rate of about 25-30 kg/h. The tip of the injector is coated with a sacrificial refractory material 1304. The sacrificial refractory material can be replaced during maintenance and acts to protect the underlying steel end-wall of the injector. It will be appreciated that fluid injector 1001 could be suitable for use with different types of reactors. For example, fluid injector 1001 could be a fuel injector, suitable for use with a combustion reactor. In another example, fluid injector 1001 could be a feedstock injector, suitable for a pyrolysis reactor. It will be appreciated that the design of the nozzle defining fluid outlet 1003 may vary according to the nature of fluid being injected. For example, larger nozzle diameters may be desirable for heavier and/or more viscous fluids.

Aspects of the invention are further disclosed in the following numbered clauses:

Clause 1. A fluid injector for a fluidised bed reactor, wherein the injector comprises an internal flow passage extending from an inlet to an outlet, the injector having a first section including the inlet and a first portion of the internal flow passage, and a second section including the outlet and a second portion of the internal flow passage, wherein the injector is configured so that, when the injector is connected to the fluidised bed reactor and the injector and the fluidised bed reactor are in use, the second section of the injector is located inside the reactor and extends into the fluidised bed, and wherein the injector additionally comprises a temperature regulator for controlling fluid temperature in at least the second section of the injector.

Clause 2. A fluid injector according to clause 1, wherein the fluid is fuel and the fluidised bed reactor is a fluidised bed combustion reactor.

Clause 3. A fluid injector according to clause 1 or clause 2, wherein the temperature regulator comprises a cooling jacket configured to receive a cooling fluid, wherein the cooling jacket extends along and surrounds the second portion of the internal flow passage.

Clause 4. A fluid injector according to clause 3, wherein the cooling jacket is a closed loop cooling jacket having a cooling fluid inlet and a cooling fluid outlet, the cooling fluid inlet and cooling fluid outlet being configured for connection to a fluid cooling system.

Clause 5. A fluid injector according to clause 3, wherein the cooling jacket is an open ended cooling jacket defining a second internal flow passage for supplying a second fluid into the reactor.

Clause 6 A fluid injector according to any preceding clause, wherein the injector comprises a temperature sensor positioned on the second section proximate the outlet.

Clause 7. A fluid injector according to any preceding clause, wherein the injector comprises an ignition electrode positioned on the second section proximate the outlet.

Clause 8. A reactor system comprising a fluidised bed reactor and at least one injector for supplying fluid into the fluidised bed reactor, the fluidised bed reactor containing a fluidised bed zone configured to accommodate a fluidised bed when the reactor system is in use, the at least one injector being an injector according to any one of clauses 1 to 7, wherein the second section of the at least one injector is located inside the reactor and extends into the fluidised bed zone.

Clause 9. A reactor system according to clause 8, wherein the fluidised bed reactor is a fluidised bed combustion reactor, and the fluid is a fuel.

Clause 10. A reactor system according to clause 9, wherein the reactor system additionally comprises a fluidised bed pyrolysis reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor.

Clause 11. A reactor system according to clause 10, wherein the pyrolysis reactor is a carbonaceous waste pyrolysis reactor suitable for pyrolysing carbonaceous waste to form a pyrolysis product, and wherein the combustion reactor is configured to receive as the fuel at least a portion of pyrolysis product produced by the pyrolysis reactor, optionally wherein the carbonaceous waste is plastic waste.

Clause 12. A reactor system according to any one of clauses 8 to 11, wherein the reactor and the at least one injector are configured so that the second section of the at least one injector extends a distance of from Y/8 to Y/2 into the fluidised bed zone, where Y is the diameter of the fluidised bed zone measured in the plane of the outlet.

Clause 13. A reactor system according to any one of clauses 8 to 12, wherein the reactor and the injector are configured so that the outlet of the at least one injector is positioned at a distance of from Z/8 to Z/2 from the bottom of the fluidised bed zone, wherein Z is the height of the fluidised bed zone.

Clause 14. A reactor system according to any one of clauses 8 to 13, wherein the reactor system comprises a fluid supply manifold for controlling supply of a first fluid and a second fluid to the at least one injector, wherein the first fluid is a first fuel and the second fluid is an inert gas.

Clause 15. A reactor system according to any one of clauses 8 to 14, wherein the at least one injector is a plurality of injectors.

Clause 16. A method of operating a reactor system, the reactor system being a reactor system according to any one of clauses 8 to 15, wherein the method comprises fluidising particulate material in the fluidised bed zone of the fluidised bed reactor, operating the at least one injector to supply a fluid into the fluidised bed, and operating the temperature regulator to control fluid temperature in at least the second section of the at least one injector.

Clause 17. A method according to clause 16, wherein the method comprises suppling fluid through each injector at a rate of from 0.5 to 75 kg/h.

Clause 18. A method according to clause 16 or clause 17, wherein the temperature regulator comprises a cooling jacket configured to receive a cooling fluid, and the method comprises supplying a cooling fluid to the cooling jacket.

Clause 19. A method according to clause 18, wherein the cooling jacket is a flow-return cooling jacket, and the method comprises circulating cooling fluid between a fluid cooler and the cooling jacket.

Clause 20. A method according to clause 18, wherein the cooling jacket is a flow-through cooling jacket, and the method comprises co-feeding the cooling fluid into the fluidised bed together with the injected fluid.

Clause 21. A method according to any of clauses 16 to 20, wherein the at least one injector comprises a temperature sensor on the second section proximate the outlet for measuring the temperature of the fluidised bed, and wherein the method comprises controlling fluid supply rate through said at least one injector in dependence on the fluidised bed temperature so measured.

Clause 22. A method according to any of clauses 16 to 21, wherein the method comprises operating the at least one injector in a fuel supply mode and subsequently operating the at least one injector in a fuel shut-off mode, wherein operating the at least one injector in the fuel supply mode comprises supplying a fuel into the fluidised bed through the at least one injector, and operating the at least one injector in the fuel shut-off mode comprises supplying an inert gas into the fluidised bed through the at least one injector to flush at least the second portion of the internal flow passage of said at least one injector.

Clause 23. A method according to any one of clauses 16 to 22, wherein the fluid is a fuel and the method comprises operating the at least one injector to maintain the fluidised bed at a pre-set operating temperature, wherein the pre-set operating temperature is a temperature of from 650° C. to 1050° C.

Clause 24. A method according to any one of clauses 16 to 23, wherein the fluidised bed reactor is a combustion reactor, and the reactor system additionally comprises a fluidised bed pyrolysis reactor; wherein the method comprises fluidising particulate material in the pyrolysis reactor to form a fluidised bed, pyrolysing feed material in the pyrolysis reactor to form a pyrolysis product, and circulating particulate material between the fluidised bed of the pyrolysis reactor and the fluidised bed of the combustion reactor.

Clause 25. A method according to clause 24, wherein the feed material is carbonaceous waste, optionally wherein the carbonaceous waste is plastic waste, and wherein the method comprises operating the at least one injector to supply at least a portion of the pyrolysis product into the fluidised bed as a fuel.

The invention claimed is:

1. A carbonaceous waste recycling apparatus configured to convert carbonaceous waste to a hydrocarbon pyrolysis product, the apparatus comprising a reactor system for pyrolysis of a carbonaceous feed material, the pyrolysis being performed in the presence of no more than trace amounts of oxygen, the reactor system comprising a fluidised bed reactor and at least one injector for supplying fluid into the fluidised bed reactor, wherein:

the at least one injector comprises an internal flow passage extending from an inlet to an outlet, the at least one injector having a first section including the inlet and a first portion of the internal flow passage, and a second section including the outlet and a second portion of the internal flow passage;

the at least one injector additionally comprises a temperature regulator for controlling fluid temperature in at least the second section of the injector, wherein the temperature regulator comprises a cooling jacket configured to receive a cooling fluid, and wherein the cooling jacket extends along and surrounds the second portion of the internal flow passage;

the fluidised bed reactor contains a fluidised bed zone configured to accommodate a fluidised bed when the reactor system is in use; and the second section of the at least one injector is located inside the reactor system and extends into the fluidised bed zone so that the outlet of the injector is positioned in the fluidised bed zone.

2. The carbonaceous waste recycling apparatus according to claim 1, wherein the cooling jacket is a closed loop cooling jacket having a cooling fluid inlet and a cooling fluid outlet, the cooling fluid inlet and cooling fluid outlet being configured for connection to a fluid cooling system.

3. The carbonaceous waste recycling apparatus according to claim 1, wherein the injector comprises a temperature sensor positioned on the second section proximate the outlet.

4. The carbonaceous waste recycling apparatus according to claim 1, wherein the reactor system and the at least one injector are configured so that the second section of the at least one injector extends a distance of from Y/8 to Y/2 into the fluidised bed zone, where Y is the diameter of the fluidised bed zone measured in the plane of the outlet.

5. The carbonaceous waste recycling apparatus according to claim 1, wherein the reactor system and the at least one injector are configured so that the outlet of the at least one injector is positioned at a distance of from Z/8 to Z/2 from the bottom of the fluidised bed zone, wherein Z is the height of the fluidised bed zone.

6. The carbonaceous waste recycling apparatus according to claim 1, wherein the reactor system comprises a fluid supply manifold for controlling supply of a first fluid and a second fluid to the at least one injector, wherein the first fluid is a first fuel or a first feedstock and the second fluid is an inert gas.

7. The carbonaceous waste recycling apparatus according to claim 1, wherein the at least one injector is a plurality of injectors.

8. The carbonaceous waste recycling apparatus according to claim 1, wherein the fluidised bed reactor is a fluidised bed pyrolysis reactor, and the fluid is a feedstock.

9. The carbonaceous waste recycling apparatus according to claim 1, wherein the fluidised bed reactor is a fluidised bed combustion reactor, and the fluid is a fuel.

10. The carbonaceous waste recycling apparatus according to claim 9, wherein the injector comprises an ignition electrode positioned on the second section proximate the outlet.

11. The carbonaceous waste recycling apparatus according to claim 9, wherein the reactor system additionally comprises a fluidised bed pyrolysis reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor.

12. The carbonaceous waste recycling apparatus according to claim 8, wherein the reactor system additionally comprises a fluidised bed combustion reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor.

13. The carbonaceous waste recycling apparatus according to claim 1, wherein:

the fluidised bed reactor is a fluidised bed pyrolysis reactor, and the fluid is a feedstock, wherein the reactor system additionally comprises a fluidised bed combustion reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor; or the fluidised bed reactor is a fluidised bed combustion reactor, and the fluid is a fuel, wherein the reactor system additionally comprises a fluidised bed pyrolysis reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor, wherein the pyrolysis reactor is a carbonaceous waste pyrolysis reactor suitable for pyrolysing carbonaceous waste to form a pyrolysis product, optionally wherein the carbonaceous waste is plastic waste, wherein:

the combustion reactor is configured to receive as fuel at least a portion of pyrolysis product produced by the pyrolysis reactor, and/or the pyrolysis reactor is configured to receive as feedstock at least a portion of pyrolysis product produced by the pyrolysis reactor.

14. The method of operating the carbonaceous waste recycling apparatus according to claim 1, wherein the method comprises fluidising particulate material in the fluidised bed zone of the fluidised bed reactor, operating the at least one injector to supply a fluid into the fluidised bed, and operating the temperature regulator to control fluid temperature in at least the second section of the at least one injector.

15. The method according to claim 14, wherein the method comprises suppling fluid through each injector at a rate of from 0.5 to 75 kg/h.

16. The method according to claim 14, wherein the cooling jacket is a flow-return cooling jacket, and the method comprises circulating cooling fluid between a fluid cooler and the cooling jacket or wherein the cooling jacket is a flow-through cooling jacket, and the method comprises co-feeding the cooling fluid into the fluidised bed together with the injected fluid.

17. The method according to claim 14, wherein the at least one injector comprises a temperature sensor on the second section proximate the outlet for measuring the temperature of the fluidised bed, and wherein the method comprises controlling fluid supply rate through said at least one injector in dependence on the fluidised bed temperature so measured and/or wherein the method comprises operating the at least one injector in a supply mode and subsequently operating the at least one injector in a shut-off mode, wherein operating the at least one injector in the supply mode comprises supplying a fuel or feedstock into the fluidised bed through the at least one injector, and operating the at least one injector in the shut-off mode comprises supplying an inert gas into the fluidised bed through the at least one injector to flush at least the second portion of the internal flow passage of said at least one injector and/or wherein the fluidised bed reactor is a fluidised bed combustion reactor, the fluid is a fuel and the method comprises operating the at least one injector to maintain the fluidised bed at a pre-set operating temperature, wherein the pre-set operating temperature is a temperature of from 650° C. to 1050° C.

18. The method according to claim 14, the reactor system of the apparatus being a reactor system wherein:
the fluidised bed reactor is a fluidised bed pyrolysis reactor, and the fluid is a feedstock, wherein the reactor system additionally comprises a fluidised bed combustion reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor; or
the fluidised bed reactor is a fluidised bed combustion reactor, and the fluid is a fuel, wherein the reactor system additionally comprises a fluidised bed pyrolysis reactor, the fluidised bed combustion reactor and the fluidised bed pyrolysis reactor each being configured to contain, in use, a fluidised bed of particulate material, and wherein the reactor system is configured to circulate particulate material between the fluidised bed combustion reactor and the fluidised bed pyrolysis reactor, wherein the method comprises fluidising particulate material in the pyrolysis reactor to form a fluidised bed, pyrolysing feed material in the pyrolysis reactor to form a pyrolysis product, and circulating particulate material between the fluidised bed of the pyrolysis reactor and the fluidised bed of the combustion reactor.

19. The method according to claim 18, wherein the feed material is carbonaceous waste, optionally wherein the carbonaceous waste is plastic waste, and wherein:
the method comprises operating the at least one injector to supply at least a portion of the pyrolysis product into the combustion reactor fluidised bed as fuel, and/or
the method comprises operating the at least one injector to supply at least a portion of the pyrolysis product into the pyrolysis reactor fluidised bed as feedstock.

20. The carbonaceous waste recycling apparatus according to claim 1, wherein the cooling jacket is an open ended cooling jacket defining a second internal flow passage for supplying a second fluid into the reactor system.

* * * * *